United States Patent
Takeda

(10) Patent No.: US 11,326,974 B2
(45) Date of Patent: May 10, 2022

(54) GAS LEAKAGE DETECTION METHOD AND GAS LEAKAGE DETECTION APPARATUS IN HORIZONTALLY-INSTALLED CANISTER

(71) Applicant: CENTRAL RESEARCH INSTITUTE OF ELECTRIC POWER INDUSTRY, Tokyo (JP)

(72) Inventor: Hirofumi Takeda, Abiko (JP)

(73) Assignee: CENTRAL RESEARCH INSTITUTE OF ELECTRIC POWER INDUSTRY

( * ) Notice: Subject to any disclaimer, the term of this patent is extended or adjusted under 35 U.S.C. 154(b) by 126 days.

(21) Appl. No.: 16/351,927

(22) Filed: Mar. 13, 2019

(65) Prior Publication Data
US 2019/0285503 A1 Sep. 19, 2019

(30) Foreign Application Priority Data

Mar. 14, 2018 (JP) .............................. JP2018-046529

(51) Int. Cl.
*G01M 3/02* (2006.01)
*G01M 3/00* (2006.01)
(Continued)

(52) U.S. Cl.
CPC .............. *G01M 3/002* (2013.01); *G01M 3/00* (2013.01); *G01N 25/72* (2013.01); *G21F 5/10* (2013.01);
(Continued)

(58) Field of Classification Search
CPC .......... G01M 3/00; G01M 3/002; G21F 5/125
See application file for complete search history.

(56) References Cited

U.S. PATENT DOCUMENTS

| | | | |
|---|---|---|---|
| 10,119,881 B2 * | 11/2018 | Takeda | G01M 3/002 |
| 10,145,754 B2 * | 12/2018 | Takeda | G21F 5/12 |
| 2013/0318989 A1 * | 12/2013 | Hood | B22F 3/12 |
| | | | 60/772 |

FOREIGN PATENT DOCUMENTS

| | | |
|---|---|---|
| JP | 2002202400 A | 7/2002 |
| JP | 2004226385 A * | 8/2004 |

(Continued)

OTHER PUBLICATIONS

Takeda, Hirofumi, et al. "Development of the detecting method of helium gas leak from canister." Nuclear engineering and design 238.5 (2008): 1220-1226. (Year: 2008).*

(Continued)

*Primary Examiner* — Herbert K Roberts
*Assistant Examiner* — Fatemeh Esfandiari Nia
(74) *Attorney, Agent, or Firm* — The Webbb Law Firm

(57) ABSTRACT

In a canister horizontally installed and housed inside a concrete silo, at least two temperatures out of a temperature $T_B$ at a canister bottom portion to be one end portion in a lateral direction in a horizontally-installed attitude, a temperature $T_{SB}$ at a canister side surface lower portion located below a horizontal plane passing through a center of the canister, a temperature $T_T$ at a canister lid portion to be the other end portion in the lateral direction, and a temperature $T_{ST}$ at a canister side surface upper portion located above the horizontal plane passing through the center of the canister are monitored, and occurrence of leakage of an inert gas inside the canister is detected when there is a change in a temperature difference between the at least two temperatures.

18 Claims, 19 Drawing Sheets

(51) Int. Cl.
*G01N 25/72* (2006.01)
*G21F 5/12* (2006.01)
*G21F 5/10* (2006.01)

(52) U.S. Cl.
CPC ............... *G21F 5/12* (2013.01); *G21F 5/125* (2019.01); *Y02E 30/30* (2013.01)

(56) References Cited

FOREIGN PATENT DOCUMENTS

| | | | |
|---|---|---|---|
| JP | 2004226385 A | | 8/2004 |
| JP | 2005265443 A | * | 9/2005 |
| JP | 2005265443 A | | 9/2005 |
| JP | 2005291882 A | | 10/2005 |
| JP | 06094894 A | * | 3/2017 |
| JP | 201758240 A | | 3/2017 |
| JP | 201775949 A | | 4/2017 |

OTHER PUBLICATIONS

English Translation—JP06094894A (Year: 1994).*

* cited by examiner

GAS LEAKAGE DETECTION METHOD AND GAS LEAKAGE DETECTION APPARATUS IN HORIZONTALLY-INSTALLED CANISTER

CROSS REFERENCE TO RELATED APPLICATIONS

This application claims priority to Japanese Patent Application No. 2018-046529 filed on Mar. 14, 2018, the entire contents of which are incorporated by reference herein.

BACKGROUND

Technical Field

The present invention relates to a method and an apparatus to detect gas leakage from a metallic canister of a concrete module. More specifically, the present invention relates to a method and an apparatus to detect leakage of an inert gas such as helium charged into a horizontally-installed canister in a horizontal silo storage.

Related Art

As a means to store highly radioactive waste materials such as spent nuclear fuel, attention is paid to a concrete module in which spent fuel is contained in a metallic canister and stored in a concrete construction storage-facility. There are types of concrete modules including: a concrete cask in which a canister is vertically installed and housed in a concrete storage-facility; and a horizontally-installed silo storage in which the canister is horizontally installed and loaded in a concrete storage-facility for safekeeping. Both are dry-type storage facilities that effectively remove decay heat of spent fuel inside the canister by circulating external air by natural convection through air communication ports provided at an upper side and a lower side of the concrete storage-facility (hereinafter simply referred to as "silo"), respectively.

In the case of the above-described concrete modules, the canister adopts a structure sealed by welding, and therefore, there is no obligation to monitor gas leakage. However, considering long-term storage, it is important to monitor integrity of the canister, and development in a technology to detect leakage of the inert gas such as helium is desired.

To respond to such desired development, the applicant of the present application proposes a helium leakage detection method in a concrete cask, in which a temperature difference between a temperature at a center of a canister bottom portion and a temperature at a center of a canister lid portion is monitored, and in a case where a value of the temperature difference is increased and a supply air temperature is decreased, it is determined that gas leakage has occurred (JP 2005-265443 A).

Additionally, the applicant of the present application also proposes a helium leakage detection method in a concrete cask, in which presence/absence of gas leakage is determined by paying attention to a change in a temperature difference between a temperature at a lid portion and a temperature at a bottom portion of a canister (JP 2017-58240 A).

The applicant of the present application further proposes a method in which a temperature at a canister bottom portion and a supply air temperature of external air passing between the canister and a concrete storage container are monitored, and when there is a significant change in correlation between actually-measured temperature data of the temperature at the canister bottom portion and actually-measured temperature data of the supply air temperature, or when there is a change in a physical amount linked to the actually-measured temperature data and associated with inert gas leakage, it is determined that inert gas leakage has occurred (JP 2017-75949 A).

SUMMARY

However, all of the technologies of JP 2005-265443 A, JP 2017-58240 A, and JP 2017-75949 A relate to a vertical concrete cask in which a canister is vertically installed for safekeeping and do not relate to a horizontal silo storage in which a canister is horizontally installed for safekeeping. There is no research made on gas leakage detection in the horizontally-installed canister, and relevance between gas leakage and a change in a surface temperature of a metallic canister is not clarified yet. Accordingly, whether a helium leakage detection mechanism in a vertical concrete cask can be directly applied is also unknown.

On the other hand, in a case of the horizontal silo storage, the canister is not needed to be suspended at a high level because the canister is loaded into a concrete silo while being kept in a horizontally-installed state, and there is an advantage of high safety against a fall accident. From this point, development and establishment of a technology to detect gas leakage from the horizontally-installed canister is desired.

The present invention is directed to providing a method and an apparatus in which gas leakage in a horizontally-installed canister can be detected.

To achieve the above-described object, the inventor of the present application has conducted various kinds of tests and research on the relevance between the gas leakage in the horizontally-installed canister and a change in a surface temperature of the metallic canister. As a result, it is found that the following phenomena occur when a pressure inside the canister is decreased by gas leakage: temperatures in all of surfaces of the canister are changed; a temperature at a canister bottom portion that is one end portion in a lateral direction in the horizontally-installed attitude and a temperature at a lower portion of a canister side surface that is a lower half portion of a canister body portion in the horizontally-installed attitude are increased; and a temperature at a canister lid portion that is the other end portion in the lateral direction in the horizontally-installed attitude and a temperature at an upper portion of the canister side surface that is an upper half portion of the canister body portion in the horizontally-installed attitude are decreased.

Additionally, it is found that: temperature increase at the canister bottom portion and temperature decrease at the canister lid portion are large at the time of gas leakage, and it is effective to use these characteristics of temperature differences for detection. Furthermore, it is found that a change amount of a temperature difference between the upper portion of the canister body portion and the lower portion of the canister body portion in the horizontally-installed attitude is smaller than a change amount of a temperature difference between the canister bottom portion and the canister lid portion, but responsiveness to gas leakage is good.

The above-described findings can be hardly predicted from the findings in the related art in which temperatures are presumably changed by natural convection in the vertically-installed canister, more specifically, a temperature at the canister lid portion is decreased while a temperature at the canister bottom portion is increased and there is almost no change in a temperature at the canister body portion between the canister lid portion and the canister bottom portion.

A gas leakage detection method in a horizontally-installed canister in order to achieve the above-described object is based on the above-described findings, and the method includes: monitoring at least two temperatures out of a temperature $T_B$ at a canister bottom portion to be one end portion in a lateral direction in a horizontally-installed attitude of the canister that is horizontally installed and housed inside a concrete silo, a temperature $T_{SB}$ at a canister side surface lower portion located below a horizontal plane passing through a center of the canister in the horizontally-installed attitude, a temperature $T_T$ at a canister lid portion to be the other end portion in the lateral direction in the horizontally-installed attitude, and a temperature $T_{ST}$ at a canister side surface upper portion located above the horizontal plane passing through the center of the canister in the horizontally-installed attitude; and determining occurrence of leakage of an inert gas inside the canister when there is a change in a temperature difference between the at least two temperatures. Note that the canister side surface represents a peripheral surface of a body portion of the canister in the horizontally-installed attitude.

The gas leakage detection method may further include determining occurrence of leakage of the inert gas inside the canister when there is a change in a temperature difference between one or both of the temperature $T_B$ at the canister bottom portion and the temperature $T_{SB}$ at the canister side surface lower portion and one or both of the temperature $T_T$ at the canister lid portion and the temperature $T_{ST}$ at the canister side surface upper portion.

The temperature $T_B$ at the canister bottom portion may be a temperature at a center of the canister bottom portion, the temperature $T_{SB}$ at the canister side surface lower portion may be a temperature at a bottom portion of the canister side surface to be a lowermost portion in the horizontally-installed attitude, the temperature $T_T$ at the canister lid portion may be a temperature at a center of the canister lid portion, and the temperature $T_{ST}$ at the canister side surface upper portion may be a temperature at a top portion of the canister side surface to be an uppermost portion in the horizontally-installed attitude.

A temperature difference to determine occurrence of leakage of the inert gas may also be a temperature difference $\Delta T_{BT}$ (where $\Delta T_{BT}=T_B-T_T$) between the temperature $T_T$ at the canister lid portion and the temperature $T_B$ at the canister bottom portion.

The temperature difference to determine occurrence of leakage of the inert gas may also be a temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

The temperature difference to determine occurrence of leakage of the inert gas may also be a temperature difference $\Delta T_{SBST}$ (where $\Delta T_{SBST}=T_{SB}-T_{ST}$) between the temperature $T_{SB}$ at the canister side surface lower portion and the temperature $T_{ST}$ at the canister side surface upper portion.

The temperature difference to determine occurrence of leakage of the inert gas may also be the sum $\Delta T_4$ (where $\Delta T_4=\Delta T_{BT}+\Delta T_{SBST}$) obtained by adding the temperature difference $\Delta T_{BT}$ ($\Delta T_{BT}=T_B-T_T$) between the temperature $T_T$ at the canister lid portion and the temperature $T_B$ at the canister bottom portion to the temperature difference $\Delta T_{SBST}$ (where $\Delta T_{SBST}=T_{SB}-T_{ST}$) between the temperature $T_{SB}$ at the canister side surface lower portion and the temperature $T_{ST}$ at the canister side surface upper portion.

The temperature difference to determine occurrence of leakage of the inert gas may also be the sum $\Delta T_{3GR}$ (where $\Delta T_{3GR}=\Delta T_{BT}+\Delta T_{BST}$) obtained by adding the temperature difference $\Delta T_{BT}$ ($\Delta T_{BT}=T_B-T_T$) between the temperature $T_B$ at the canister bottom portion and the temperature $T_T$ at the canister lid portion to the temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

Additionally, the temperature difference to determine occurrence of leakage of the inert gas may also be the sum $\Delta T_{3R}$ (where $\Delta T_{3R}=\Delta T_{SBST}+\Delta T_{BST}$) obtained by adding the temperature difference $\Delta T_{SBST}$ ($\Delta T_{SBST}=T_{SB}-T_{ST}$) between the temperature $T_{SB}$ at the canister side surface lower portion and the temperature $T_{ST}$ at the canister side surface upper portion to the temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

Additionally, a gas leakage detection apparatus in a horizontally-installed canister in order to achieve the above-described object includes: at least two sensors out of a first temperature sensor adapted to measure a temperature $T_B$ at a canister bottom portion to be one end portion in a lateral direction in a horizontally-installed attitude of the canister that is horizontally installed and housed inside a concrete silo, a third temperature sensor adapted to measure a temperature $T_{SB}$ at a canister side surface lower portion located below a horizontal plane passing through a center of the canister in the horizontally-installed attitude, a second temperature sensor adapted to measure a temperature $T_T$ at a canister lid portion to be the other end portion in the lateral direction in the horizontally-installed attitude, and a fourth temperature sensor adapted to measure a temperature $T_{ST}$ at a canister side surface upper portion located above the horizontal plane passing through the center of the canister in the horizontally-installed attitude; a monitoring unit adapted to monitor measurement values of the at least the two sensors out of the first temperature sensor, the third temperature sensor, the second temperature sensor, and the fourth temperature sensor; and a gas leakage determination unit adapted to determine occurrence of leakage of an inert gas inside the canister when a change in a difference between the at least two measurement values to be monitored exceeds a threshold value.

The gas leakage detection apparatus may include at least one of the first temperature sensor and the third temperature sensor and at least one of the second temperature sensor and the fourth temperature sensor, and the monitoring unit may monitor a measurement value of at least one of the first temperature sensor and the third temperature sensor and a measurement value of at least one of the second temperature sensor and the fourth temperature sensor.

According to the gas leakage detection method and the gas leakage detection apparatus in a horizontally-installed canister of the present invention, temperatures are changed at the time of gas leakage in the four parts (specifically, all of surfaces/parts of the canister) including the canister bottom portion, canister lid portion, canister side surface lower portion, and canister side surface upper portion. Furthermore, the four parts are separated into: two parts where surface temperatures are decreased; and the two parts where surface temperatures are increased. Also, temperature increase parts are separated into a part having large temperature increase and a part having little temperature increase, and temperature decrease parts are separated into a part having large temperature decrease and a part having little temperature decrease, and a change is caused in any temperature difference obtained between any parts. Therefore, it is possible to determine occurrence of leakage of the inert gas such as helium by paying attention to a change in a temperature difference between at least two parts out of the four parts when there is a change in the temperature difference.

Furthermore, among the above-described four temperature monitoring parts (in other words, temperature measurement positions), a temperature difference is obtained by combining two or more of the temperature monitoring parts from among, specifically, the temperature monitoring parts where temperature increase is observed and the temperature monitoring parts where temperature decrease is observed. As a result, it is possible to suitably select a combination exhibiting a large change in a temperature difference at the time of pressure decrease, a combination having good responsiveness to a pressure change, and a combination satisfying both a significant change in a temperature difference and good responsiveness to a pressure change.

BRIEF DESCRIPTION OF DRAWINGS

FIG. 3A is a view from a canister bottom portion side, FIG. 3B is a view from a canister lid portion side, FIG. 3C is a diagram illustrating installation positions of temperature sensors in a heating element A, FIG. 3D is a diagram illustrating installation positions of temperature sensors in a heating element B, and FIG. 3E is a diagram illustrating positions of temperature sensors to measure temperatures of a gas inside the canister;

FIG. 4A is a diagram illustrating temperature measurement points at the canister bottom portion, FIG. 4B is a diagram illustrating temperature measurement points at the canister lid portion, and FIG. 4C is a diagram illustrating temperature measurement points at a canister side surface;

DETAILED DESCRIPTION

Figure 1:
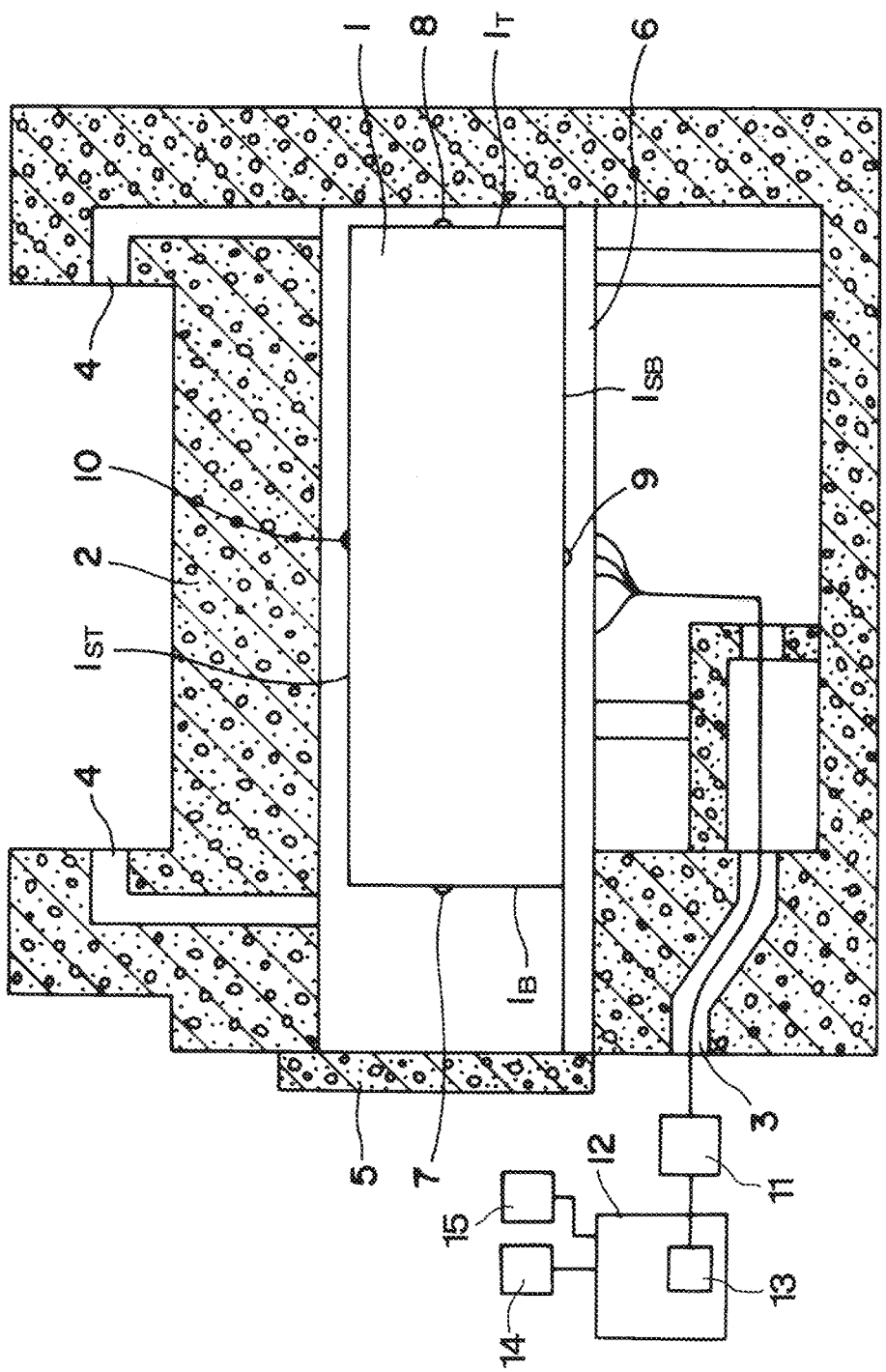
FIG. 1 is a schematic explanatory view illustrating one embodiment of a concrete dry-type horizontally-installed spent fuel storage silo to which a gas leakage detection method and a gas leakage detection apparatus in a horizontally-installed canister of the present invention is applied.

In the following, structures of the present invention will be described based on embodiments illustrated in the drawings.

FIG. 1 illustrates one embodiment of a concrete dry-type horizontally-installed spent fuel storage silo to which a gas leakage detection method and a gas leakage detection apparatus according to the present invention is applied.

The concrete dry-type horizontally-installed spent fuel storage silo according to the present embodiment includes, for example: a concrete storage-facility (hereinafter referred to as "silo 2") having a shielding function; and a metallic canister (hereinafter referred to as "canister 1") having a structure housing spent fuel and being sealed by welding. The horizontally-installed spent fuel storage silo also has a structure in which decay heat of the spent fuel inside the canister 1 is removed by circulating external air by natural convection through a supply air port 3 for cooling air and an exhaust air port 4 which are provided on an upper side and a lower side of the silo 2, respectively.

Note that, in FIG. 1, reference sign 5 indicates a silo shielding lid, reference sign 6 indicates a rail-shaped supporting base supporting the canister 1 horizontally installed, reference sign 7 indicates a first temperature sensor, reference sign 8 indicates a second temperature sensor, reference sign 9 indicates a third temperature sensor, reference sign 10 indicates a fourth temperature sensor, reference sign 11 indicates a temperature measurement device, reference sign 12 indicates a computer, reference sign 13 indicates a gas leakage determination unit, reference sign 14 indicates a display device, and reference sign 15 indicates a warning unit.

The canister 1 is made of, for example, stainless steel and generally has a sealed structure in which a double lid including an inner cover plate and an outer cover plate is installed, by welding, in a cylindrical container having a bottom. For example, stainless steel partitions having a honeycomb structure (hereinafter referred to as "basket") is inserted in the canister 1, and spent nuclear fuel that is a radioactive material is charged into each of the partitions.

The canister 1 adopts a structure hermetically sealed by welding so as not to leak the enclosed radioactive material to the outside, and also has a structure in which an inert gas such as helium having heat conductivity higher than that of the air is enclosed inside the canister, and decay heat of the spent fuel inside the canister is transferred to an outer surface/surface of the canister via the inert gas such as helium and via the basket.

For example, using helium as the gas to be enclosed inside the canister 1 is preferable, but the gas is not necessarily limited to helium, and another inert gas having heat conductivity higher than the heat conductivity of the air may also be used.

In the case of the present embodiment, the canister 1 includes: the first temperature sensor 7 to measure a temperature at the canister bottom portion $1_B$ that is one end portion in a lateral direction in the horizontally-installed attitude (referred to as a "canister bottom portion temperature $T_B$" in the present specification); the third temperature sensor 9 to measure a temperature at a lower portion $1_{SB}$ of the canister side surface that is a side surface region lower than a horizontal plane passing through the center of the canister 1 in the horizontally-installed attitude (referred to as a "canister side surface lower portion temperature $T_{SB}$" in the present specification); the second temperature sensor 8 to measure a temperature at the canister lid portion $1_T$ that is the other end portion in the lateral direction in the horizontally-installed attitude (referred to as a "canister lid portion temperature $T_T$" in the present specification); and the fourth temperature sensor 10 to measure a temperature at an upper portion $1_{ST}$ of the canister side surface that is a side surface region higher than the horizontal plane passing through the center of the canister 1 in the horizontally-installed attitude (referred to as a "canister side surface upper portion temperature $T_{ST}$" in the present specification).

As measurement parts of surface temperatures of the canister 1, at least two parts out of the canister bottom portion $1_B$, canister side surface lower portion $1_{SB}$, canister lid portion $1_T$, and canister side surface upper portion $1_{ST}$ may be selected. However, it is preferable that at least two parts are selected, in which the two parts includes: at least one part out of the canister bottom portion $1_B$ and the canister side surface lower portion $1_{SB}$; and at least one part of the canister lid portion $1_T$ and the canister side surface upper portion $1_{ST}$. Additionally, in a case where three parts or four parts (specifically, all of the parts) are selected, the number of combinations of temperature differences is increased, a more sensitive gas leakage detection can be achieved, and gas leakage can be detected with higher accuracy.

Preferably, the first temperature sensor 7 and the second temperature sensor 8 measure temperatures at the centers, specifically, respective center positions in a radial direction of the surfaces of the canister bottom portion $1_B$ and the canister lid portion $1_T$.

Temperature changes in the canister bottom portion $1_B$ and the canister lid portion $1_T$ in occurrence of inert gas leakage are largest at the center positions of the respective surfaces. Therefore, detection sensitivity can be more improved by measuring the canister bottom portion temperature $T_B$ at the center of the canister bottom portion and the canister lid portion temperature $T_T$ at the center of the canister lid portion, and furthermore, highly-reliable gas leakage detection can be further expected.

However, the first temperature sensor 7 and the second temperature sensor 8 are not limited to measuring the temperatures at the center of the canister bottom portion $1_B$ and the center of the canister lid portion $1_T$, and may be arranged at positions close to edges of the respective surfaces so as to measure temperatures at positions away from the centers of the respective surfaces.

Preferably, the third temperature sensor 9 measures the canister side surface lower portion temperature $T_{SB}$ at a bottom portion of the canister side surface to be a lowermost portion of the cylindrical body portion of the canister 1 in the horizontally-installed attitude (note that a peripheral surface of the body portion is the canister side surface).

Preferably, the fourth temperature sensor 10 measures the canister side surface upper portion temperature $T_{ST}$ at a top portion of the canister side surface to be an uppermost portion of the cylindrical body portion of the canister 1 in the horizontally-installed attitude.

A temperature change in the canister side surface lower portion $1_{SB}$ in occurrence of inert gas leakage is largest at the bottom portion of the canister side surface to be the lowermost portion in the horizontally-installed attitude. Additionally, a temperature change in the canister side surface upper portion $1_{ST}$ in occurrence of inert gas leakage is largest at the top portion of the canister side surface to be the uppermost portion in the horizontally-installed attitude.

Furthermore, preferably, the canister side surface lower portion temperature $T_{SB}$ and the canister side surface upper portion temperature $T_{ST}$ are respectively the temperatures at the centers or approximate center positions in the axial direction of the cylindrical body portion of the canister 1 (specifically, in the lateral direction in the horizontally-installed attitude).

A temperature change on the canister side surface in occurrence of inert gas leakage is largest at the center position in the axial direction of the body portion of the canister 1 in each of the canister side surface top portion and the canister side surface bottom portion.

However, the third temperature sensor 9 and the fourth temperature sensor 10 are not limited to measuring the temperatures at the canister side surface bottom portion and the canister side surface top portion, and may measure respective temperatures at an arbitrary position of the canister side surface lower portion $1_{SB}$ and an arbitrary position of the canister side surface upper portion $1_{ST}$.

As the first to fourth temperature sensors 7, 8, 9, and 10, it is preferable to use a temperature measurement means such as a thermocouple or a thermistor. In this case, besides advantages of being simple in structure and being inexpensive, long-term stable operation can be expected because of the simple and sturdy structure.

For example, in the case where thermocouples are used as the temperature sensors 7, 8, 9, and 10, these thermocouples are electrically connected to the temperature measurement device 11 and temperatures can be measured by utilizing thermoelectromotive force by the Seebeck effect.

In the view of improving detection sensitivity of inert gas leakage, it is preferable that each of the temperature sensors 7, 8, 9, and 10 is set in a manner directly contacting the surface of the canister 1 to directly measure the temperature at each of the points, but in some cases, it is also possible to measure a surface temperature or a temperature extremely close to the surface by using a non-contact type thermometer. In the description of the present invention, the surface temperature and the temperature extremely close to the surface will be collectively referred to simply as "surface temperature".

Temperature information of the four parts (specifically, all of the surfaces/parts of the canister 1) including the canister bottom portion, canister lid portion, canister side surface lower portion, and canister side surface upper portion, which is obtained by the first to fourth temperature sensors 7, 8, 9, and 10, includes information of pressure changes inside the canister.

Specifically, it is found by the inventor of the present application through tests that: the surface temperatures of the canister are changed as follows when the pressure inside the horizontally-installed canister is decreased by gas leakage: the canister bottom portion temperature $T_B$ and the canister side surface lower portion temperature $T_{SB}$ are increased; and the canister lid portion temperature $T_T$ and the canister side surface upper portion temperature $T_{ST}$ are decreased. Furthermore, it is found that increase in the canister bottom portion temperature $T_B$ is larger than increase in the canister side surface lower portion temperature $T_{SB}$ when comparing the canister bottom portion temperature $T_B$ with the canister side surface lower portion temperature $T_{SB}$, and the canister lid portion temperature $T_T$ is decreased more than the canister side surface upper portion temperature $T_{ST}$ when comparing the canister lid portion temperature $T_T$ with the canister side surface upper portion temperature $T_{ST}$. Therefore, there is a change caused by gas leakage in any temperature difference between any parts.

Accordingly, among the surface temperatures of the canister 1 obtained at the temperature measurement positions of the four parts, measurement values of the surface temperatures at at least two parts are monitored and a temperature difference between the measured values are monitored, and when there is a change in the temperature difference, it is grasped that pressure decrease by gas leakage is caused inside the canister.

For example, in the canister 1 horizontally installed and housed inside the concrete silo 2, one or both of two surface temperature increase parts including the canister bottom portion $1_B$ (temperature $T_B$) and the canister side surface lower portion $1_{SB}$ (temperature $T_{SB}$) and one or both of the two surface temperature decrease parts including the canister lid portion $1_T$ (temperature $T_T$) and the canister side surface upper portion $1_{ST}$ (temperature $T_{ST}$) are monitored. When a change indicating gas leakage is observed in a temperature difference between at least two parts out of the surface temperature increase parts and the surface temperature decrease parts, specifically, when there is increase of a certain amount or more in the temperature difference, it can be determined that gas leakage is occurring.

Here, in a combination including the two surface temperature increase parts $1_B$ and $1_{SB}$ (temperatures $T_B$ and $T_{SB}$) and the two surface temperature decrease parts $1_T$ and $1_{ST}$ (temperatures $T_T$ and $T_{ST}$), one increase part and one decrease part may be used. Alternatively, any one of following cases is also applicable: a case of using three parts including the two increase parts and one decrease part in order to emphasize a change in a temperature difference, a case of using three parts including the two decrease parts and one increase part, and also a case of using all of the four parts including the two increase parts and the two decrease parts. Additionally, it is possible to cancel a change in an external air temperature from two target temperatures by calculating and using a temperature difference, and influence of a change in the external air temperature can be hardly received.

For example, in a case of combining one surface temperature increase part and one surface temperature decrease part, temperature differences can be obtained by calculation from four combinations including $\Delta T_{BT}$ (where $\Delta T_{BT}=T_B-T_T$), $\Delta T_{SBST}$ (where $\Delta T_{SBST}=T_{SB}-T_{ST}$), $\Delta T_{BST}$ (where $\Delta T_{BST}=T_B-T_{ST}$), and $\Delta T_{SBT}$ (where $\Delta T_{SBT}=T_{SB}-T_T$).

Figure 10:
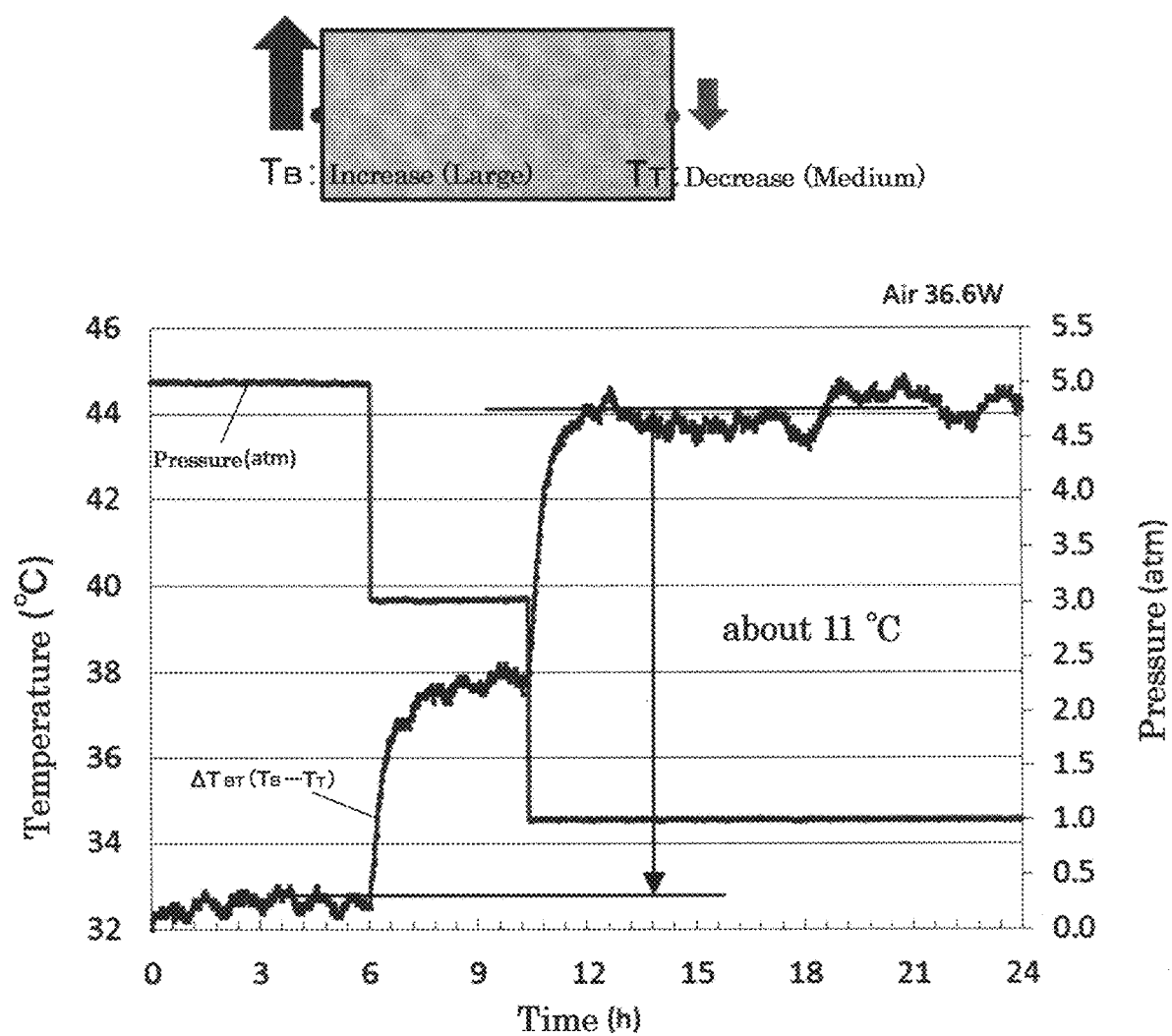
FIG. 10 is a graph illustrating changes in a temperature difference $\Delta T_{BT}$ between the temperature $T_T$ at the canister lid portion and the temperature $T_B$ at the canister bottom portion relative to the internal pressure of the canister before and after helium leakage in Case 1.

Additionally, since the temperature difference $\Delta T_{BT}$ is larger than the temperature difference $\Delta T_{SBST}$ between the two temperature monitoring parts having relatively small change amounts as illustrated in FIG. 10, using the temperature difference $\Delta T_{BT}$ between the two temperature monitoring parts (in other words, temperature measurement positions) having large change amounts in the surface temperatures is preferable from the viewpoint of a temperature difference.

Figure 11:
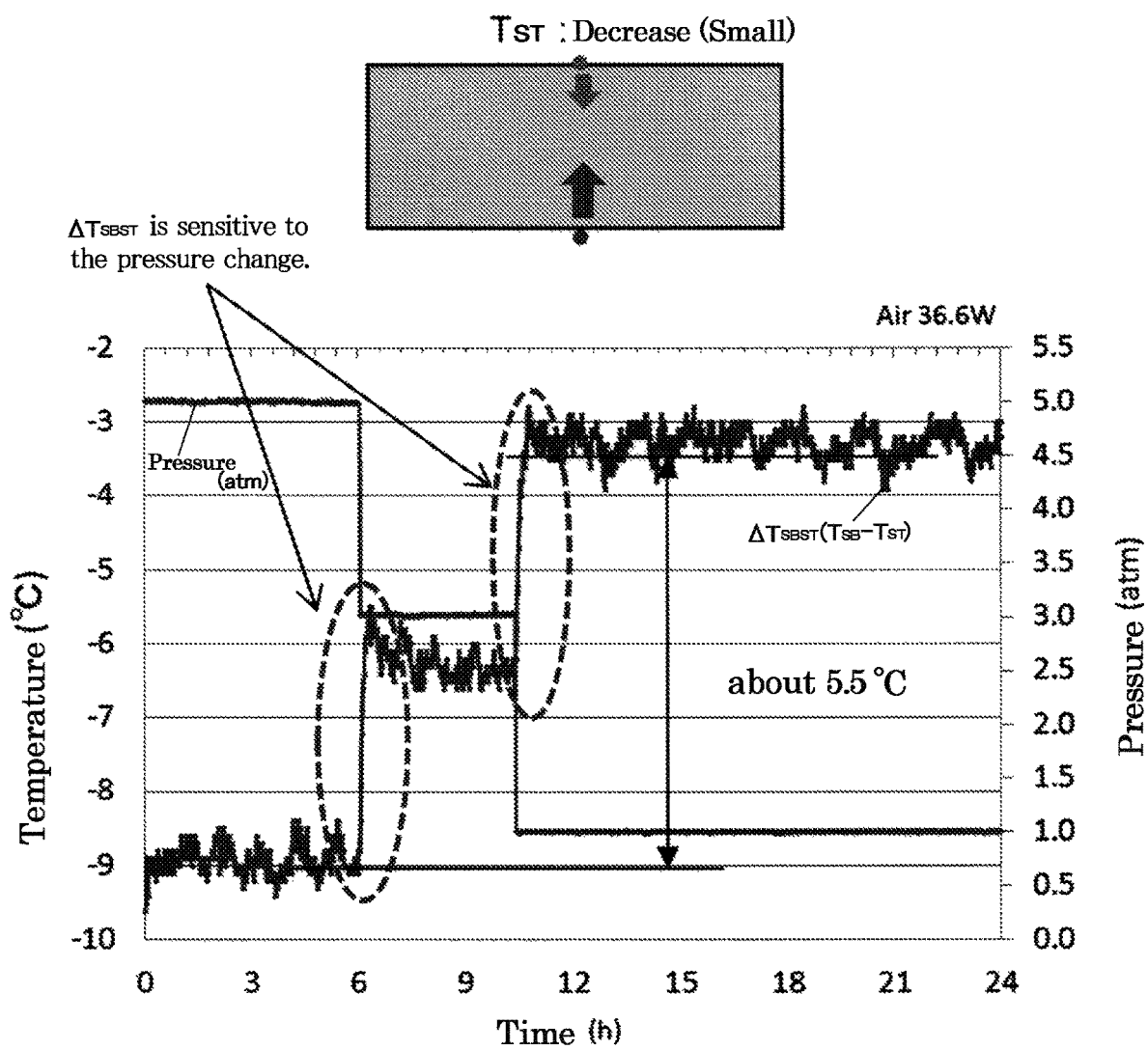
FIG. 11 is a graph illustrating changes in a temperature difference $\Delta T_{SBST}$ between the temperature $T_{SB}$ at the canister side surface lower portion and the temperature $T_{ST}$ at the canister side surface upper portion relative to the internal pressure of the canister before and after helium leakage in Case 1.

On the other hand, using the temperature difference $\Delta T_{SBST}$ between the two temperature monitoring parts having the relatively small change amounts in the surface temperature is preferable in the viewpoint of responsiveness to a pressure change because, as illustrated in FIG. 11, the responsiveness is more excellent in a region surrounded by a broken line than in the temperature monitoring parts in which the temperature difference $\Delta T_{BT}$ is obtained despite a fact that the temperature difference $\Delta T_{SBST}$ is smaller than the temperature difference $\Delta T_{BT}$ between the two temperature monitoring parts having the large change amounts.

Figure 12:
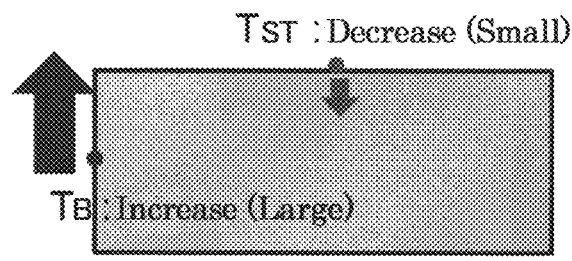
FIG. 12 is a graph illustrating changes in a temperature difference $\Delta T_{BST}$ between the temperature $T_B$ at the canister bottom portion and the temperature $T_{ST}$ at the canister side surface upper portion relative to the internal pressure of the canister before and after helium leakage in Case 1.
Figure 12:
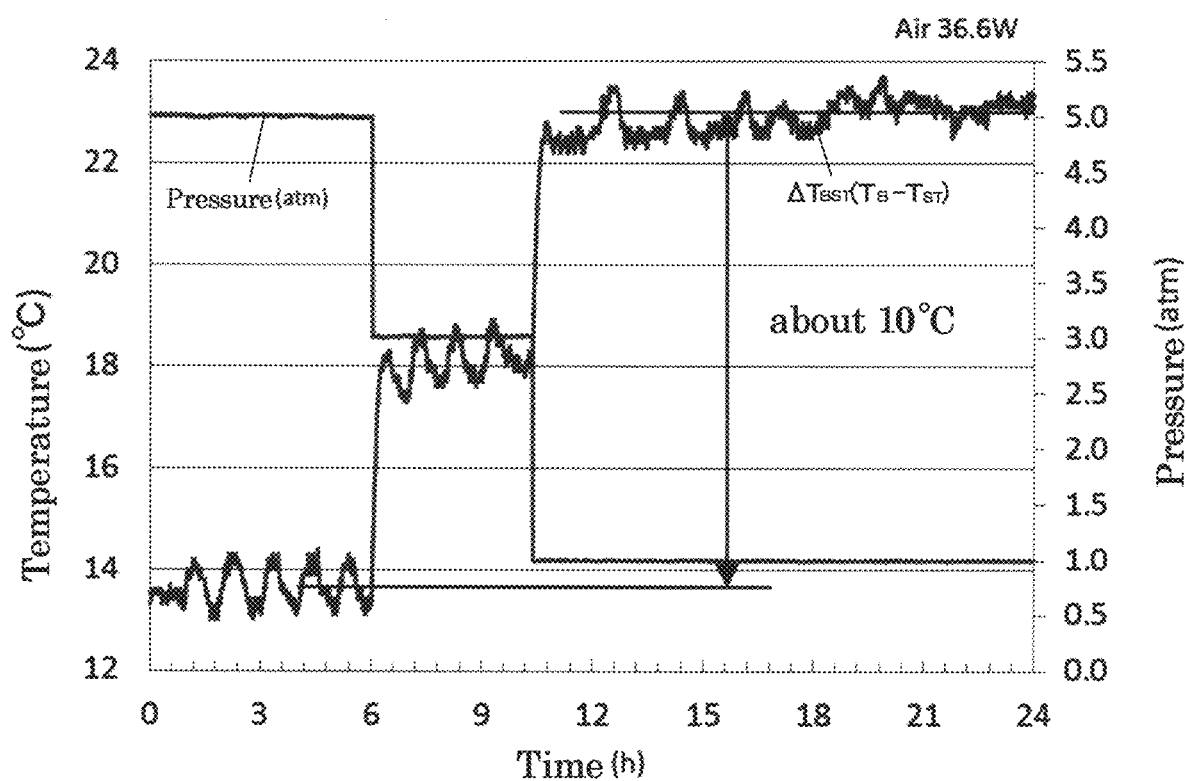

Furthermore, combining a temperature monitoring part having a large change amount in the surface temperature with a temperature monitoring part having a small change amount in the surface temperature, specifically, using the temperature difference $\Delta T_{BST}$ is preferable in a viewpoint of achieving both pressure responsiveness and temperature difference clarity because, as illustrated in FIG. 12, the responsiveness to a pressure change is excellent and a large temperature difference can be obtained despite a fact that the temperature difference $\Delta T_{BST}$ is slightly smaller than $\Delta T_{BT}$ while being larger than $\Delta T_{SBST}$.

Figure 13:
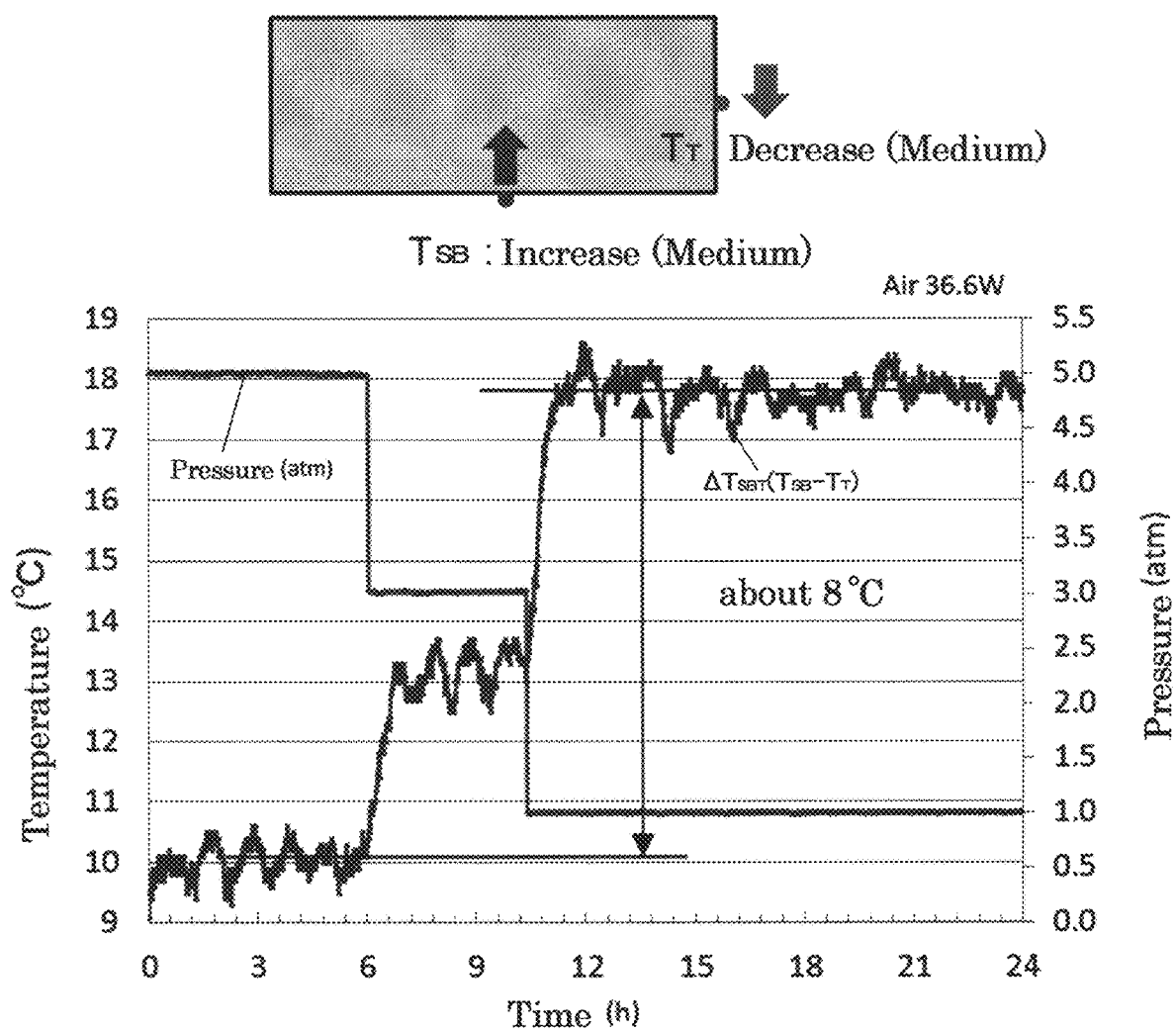
FIG. 13 is a graph illustrating a change in a temperature difference $\Delta T_{SBT}$ between the temperature $T_{SB}$ at the canister side surface lower portion and the temperature $T_T$ at the canister lid portion relative to the internal pressure of the canister before and after helium leakage in Case 1.

Additionally, as illustrated in FIG. 13, using $\Delta T_{SBT}$ has an advantage of having a large temperature difference although responsiveness to a pressure change of $\Delta T_{SBT}$ is inferior to that of $\Delta T_{SBST}$.

In the case of using the three parts including the two surface temperature increase parts and one surface temperature decrease part, it is possible to have two kinds of combinations including, for example, the sum $\Delta T_{3R}$ of the temperature differences (where $\Delta T_{3R}=\Delta T_{SBST}+\Delta T_{BST}$) using the canister side surface upper portion temperature $T_{ST}$ having a relatively small decrease amount of the surface temperature and the sum $\Delta T_{3R}$ of the temperature differences (where $\Delta T_{3R}=\Delta T_{SBT}+\Delta T_{BT}$) using the canister lid portion temperature $T_T$ having a medium temperature decrease amount of the surface temperature.

Figure 15:
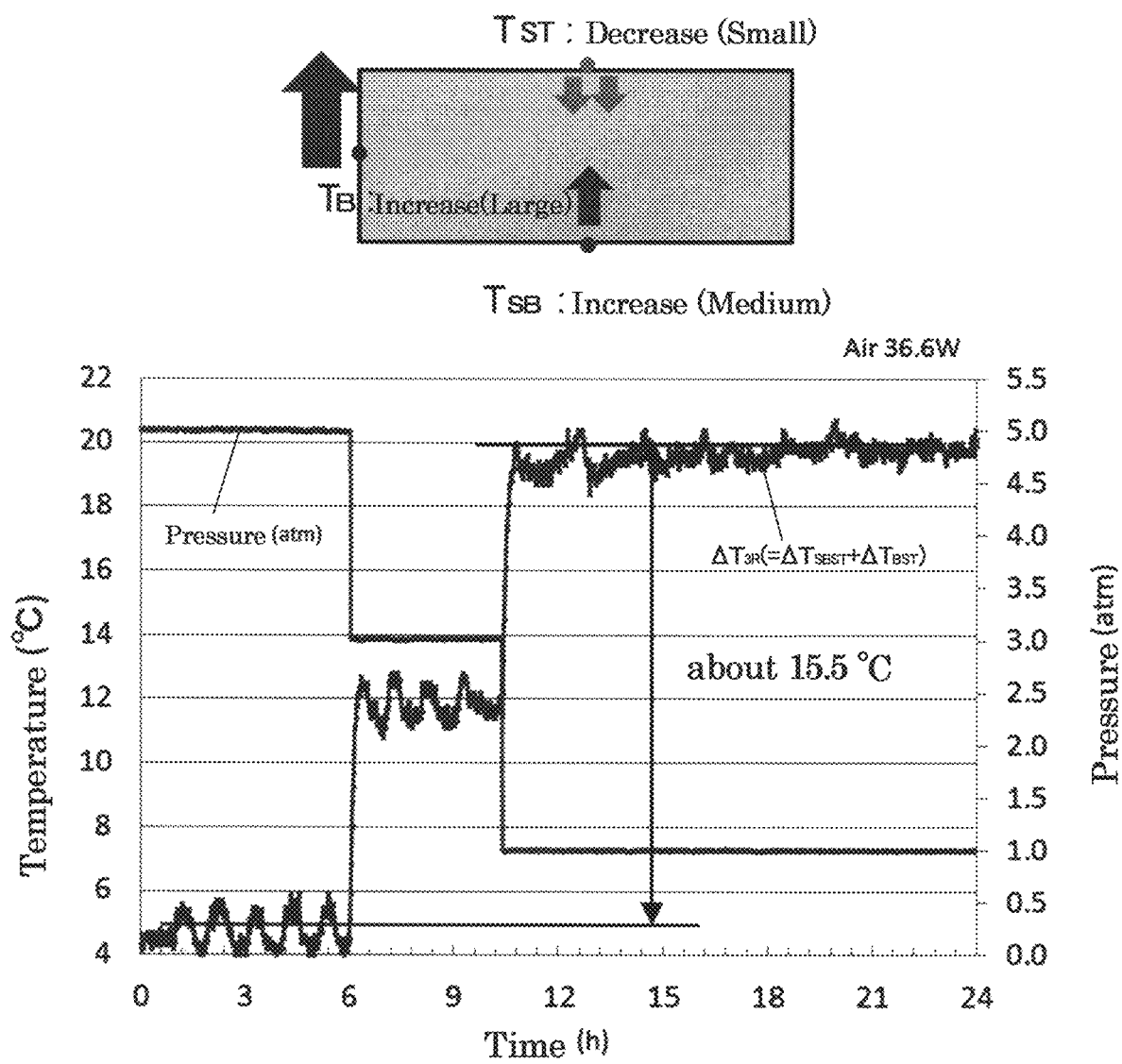
FIG. 15 is a graph illustrating changes in the sum $\Delta T_{3R}$ of the temperature differences, namely, the sum of the temperature difference $\Delta T_{SBST}$ and the temperature difference $\Delta T_{BST}$ relative to the internal pressure of the canister before and after helium leakage in Case 1.

In this case, it is preferable to use the sum $\Delta T_{3R}$ of the temperature differences (where $\Delta T_{3R}=\Delta T_{SBST}+\Delta T_{BST}$) using the canister side surface upper portion temperature $T_{ST}$. In the case of using the sum $\Delta T_{3R}$ of the temperature differences (where $\Delta T_{3R}=\Delta T_{SBST}+\Delta T_{BST}$), combinations having respectively excellent pressure responsiveness are summed. Therefore, the pressure responsiveness is excellent and the temperature difference can be increased approximately 1.5 times compared to $\Delta T_{BT}$ as illustrated in FIG. 15.

In the case of using all of the four parts including the two surface temperature increase parts and the two surface temperature decrease parts, it is possible to have two kinds of combinations including, for example: the sum $\Delta T_4$ of the temperature differences (where $\Delta T_4=\Delta T_{BT}+\Delta T_{SBST}$) in which the two temperature monitoring parts both having the large change amounts in the surface temperatures are paired and the two temperature monitoring parts both having the relatively small change amounts in the surface temperatures are paired; and the sum $\Delta T_4$ of the temperature differences (where $\Delta T_4=\Delta T_{BST}+\Delta T_{SBT}$) in which each of the temperature monitoring parts having the large change amounts in the surface temperatures is paired with each of the temperature monitoring parts having the relatively small change amounts in the surface temperatures.

Figure 14:
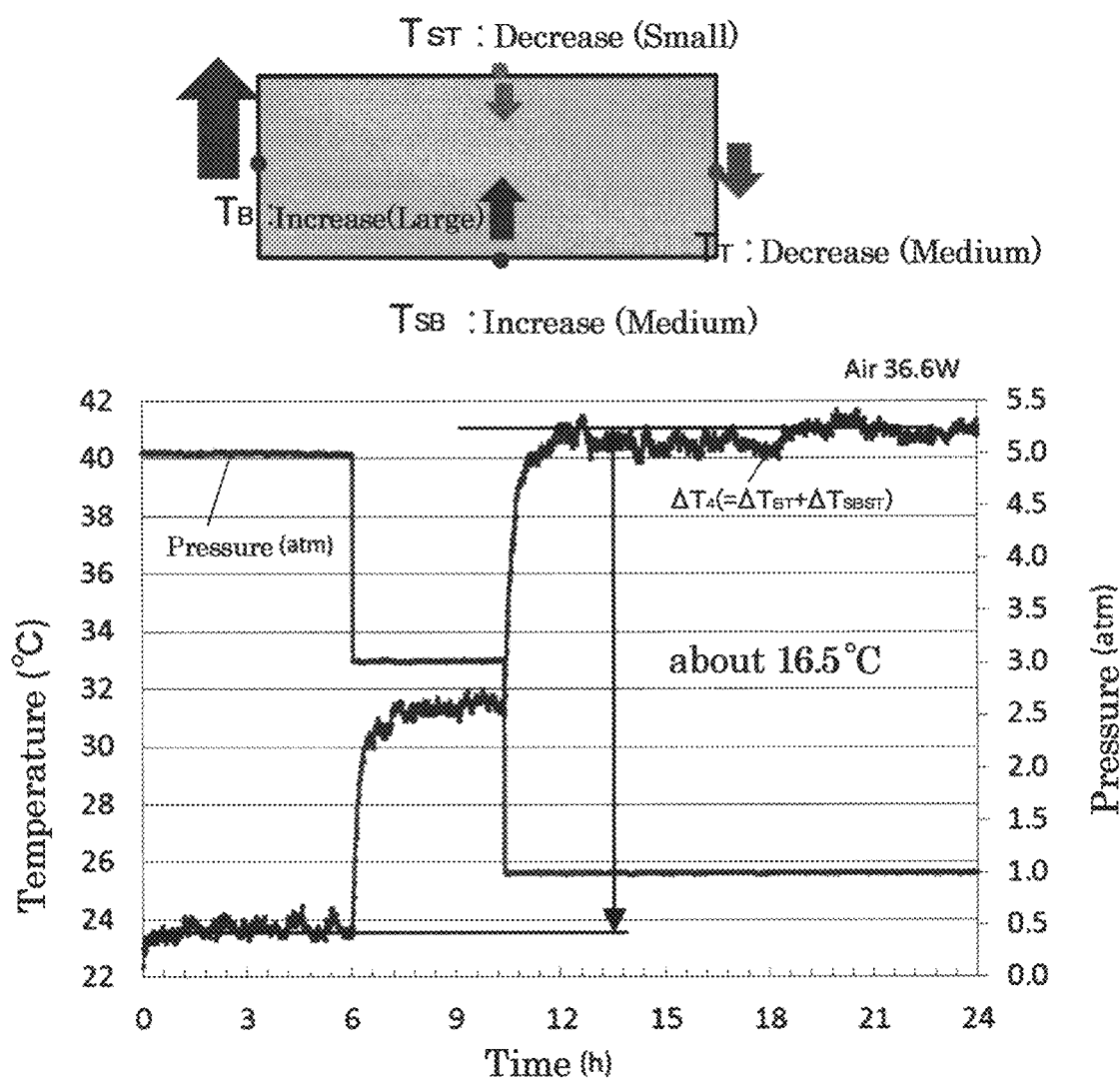
FIG. 14 is a graph illustrating changes in the sum $\Delta T_4$ of the temperature differences, namely, the sum of the temperature difference $\Delta T_{BT}$ and the temperature difference $\Delta T_{SBST}$ relative to the internal pressure of the canister before and after helium leakage in Case 1.

In this case, it is preferable to use $\Delta T_4=\Delta T_{BT}+\Delta T_{SBST}$ as $\Delta T_4$. In the case of using $\Delta T_4=\Delta T_{BT}+\Delta T_{SBST}$, the temperature difference can be increased 1.5 times compared to $\Delta T_{BT}$ as illustrated in FIG. 14.

Furthermore, in the case of using three parts including the two surface temperature decrease parts and one surface temperature increase parts, it is possible to have two kinds of combinations including, for example: the sum $\Delta T_{3GR}$ of the temperature differences (where $\Delta T_{3GR}=\Delta T_{BT}+\Delta T_{BST}$) in which the canister bottom portion temperature $T_B$ is used; and the sum $\Delta T_{3GR}$ of the temperature differences (where $\Delta T_{3GR}=\Delta T_{SBST}+\Delta T_{BST}$) in which the canister side surface lower portion temperature $T_{SB}$ is used.

Figure 16:
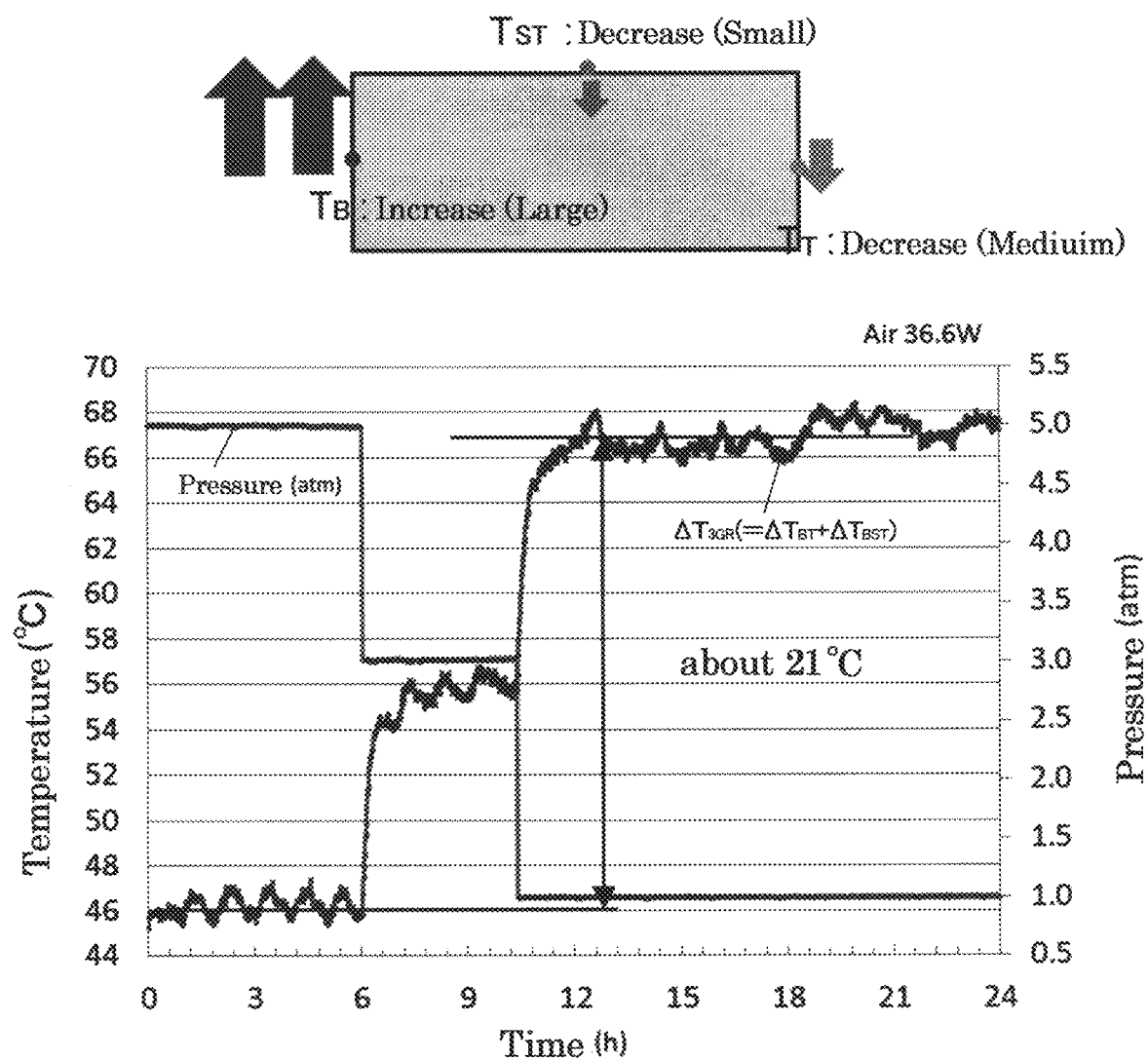
FIG. 16 is a graph illustrating changes in the sum $\Delta T_{3GR}$ of the temperature differences, namely, the sum of the temperature difference $\Delta T_{BT}$ and the temperature difference $\Delta T_{BST}$ relative to the internal pressure of the canister before and after helium leakage in Case 1.

In this case, it is preferable to use $\Delta T_{3GR}$ using the canister bottom portion temperature $T_B$. As illustrated in FIG. 16, in the case of using $\Delta T_{3GR}=\Delta T_{BT}+\Delta T_{BST}$, the temperature difference can be increased substantially twice compared to the temperature difference $\Delta T_{BT}$.

The above-described gas leakage detection method can be implemented by using, for example, a computer and can be implemented as a system capable of automatically detecting gas leakage.

For example, as illustrated in FIG. 1, the gas leakage detection apparatus including the computer 12 executes a gas leakage detection program stored in a memory unit (not illustrated) so as to: read, from the temperature measurement device 11, measurement values of the first temperature sensor 7 to fourth temperature sensor 10; calculate a difference between at least selected two measurement values, specifically, a temperature difference; monitor a change in the temperature difference; determine occurrence of gas leakage by the gas leakage determination unit 13 when the change in the temperature difference exceeds a threshold value; and output a determination result to the display device 14 or the warning unit 15.

Specifically, the computer 12 reads, from the temperature measurement device 11, the canister bottom portion temperature $T_B$ and the canister lid portion temperature $T_T$ detected by the first and second temperature sensors 7 and 8 respectively, and calculates the temperature difference $\Delta T_{BT}$ between the canister bottom portion temperature $T_B$ and the canister lid portion temperature $T_T$ by execution of the gas leakage detection program stored in the memory unit.

Next, the gas leakage determination unit 13 of the computer 12 estimates presence/absence of gas leakage by determining whether there is a change indicating gas leakage in the temperature difference $\Delta T_{BT}$ to be monitored, for example, determining whether there is a change exceeding the threshold value. For example, a preferable method is to detect gas leakage before 10% leakage of the inert gas inside the canister.

In the tests conducted by the inventor of the present application, a temperature difference of 11° C. (about 21° C. in some cases) when 100% leakage occurs. Accordingly, occurrence of gas leakage can be determined when a change in the temperature difference reaches 2° C. by setting 2° C. as a threshold to indicate a change in the temperature difference at the time of 10% leakage, for example. Therefore, even when gas leakage occurs rapidly, time elements do not affect the determination. A difference between at least two measurement values, specifically, a temperature difference is constantly monitored, and whether the value is plus or minus is determined in a computer logic circuit. A state in which the temperature difference is constantly plus is determined as gas leakage.

Additionally, as a gas leakage detection system, the computer 12 may be made to execute various warning behaviors such as warning sound and warning light emission when conditions by which the computer 12 determines occurrence of gas leakage are fulfilled. Note that it is preferable to visualize the warning behaviors in terms of checking a non-abnormal state.

For example, the computer 12 is made to function as a display control unit that constantly displays, on the display device 14, a temperature difference to be monitored and displays, for comparison, the temperature difference to be monitored in parallel with a temperature difference in a normal state having no gas leakage as a reference temperature difference. With such a display, an operator can visually and intuitively determine occurrence of abnormality, specifically, occurrence of gas leakage.

Meanwhile, the above-described embodiment is an example of a preferred embodiment of the present invention, but a specific mode to implement the present invention is not limited to the above-described embodiment, and various modifications can be made to implement the present invention within a range not departing from the scope of the present invention.

For example, in the gas leakage detection apparatus according to the above-described embodiment, occurrence of gas leakage is determined by monitoring, as a monitoring target, the temperature difference $\Delta T_{BT}$ between the canister bottom portion temperature $T_B$ and the canister lid portion temperature $T_T$. However, the temperature difference to be monitored is not limited to $\Delta T_{BT}$. There are two temperature monitoring parts in each of the parts, specifically, the parts include the two parts where the surface temperatures are decreased and the two parts where the surface temperatures are increased. Therefore, there is the plurality of possible combinations as described above. Moreover, it is possible to suitably select gas leakage detection having a different characteristic depending on a combination of the respective temperature monitoring parts, specifically, it is possible to select a combination exhibiting a large change in a temperature difference at the time of pressure decrease and/or a combination exhibiting good responsiveness to a pressure change.

Furthermore, in the present invention, due to a phenomenon caused by the internal structure of the canister and peculiar to the horizontally-installed canister, temperatures are changed at the time of gas leakage at the four parts (specifically, all of the surfaces/parts of the canister) including the canister bottom portion, canister lid portion, canister side surface lower portion, and canister side surface upper portion. Additionally, the four parts are separated into: two parts where surface temperatures are decreased; and the two parts where surface temperatures are increased. Also, the temperature increase parts are separated into a part having large temperature increase and a part having little temperature increase, and temperature decrease parts are separated into a part having large temperature decrease and a part having little temperature decrease. Therefore, a change is caused in any temperature difference obtained between any parts.

Additionally, in the present invention, since attention is paid to change amounts in the temperature differences as for the temperature changes in the four parts, it is possible to adopt, as information to determine occurrence of gas leakage, a change in a difference between at least two measurement values out of the temperatures $T_B$, $T_{SB}$, $T_T$, and $T_{ST}$. The information to determine occurrence of gas leakage further includes a temperature difference $\Delta T_{BSB}$ (where $\Delta T_{BSB}=T_B-T_{SB}$) between the surface temperature increase parts and a temperature difference $\Delta T_{TST}$ (where $\Delta T_{TST}=T_T-T_{ST}$) between the surface temperature decrease parts.

EXAMPLES

A relation between an internal pressure and a temperature at each of the portions of the apparatus was studied by conducting tests (here, two cases including Case 1 and Case 2) while setting, as parameters, internal pressures (concretely, 5 atm, 3 atm, and 1 atm) and calorific values (concretely, 11.5 W and 36.6 W) by using a canister model having a size of 1/18 of an actual machine.

(1) Test Apparatus

Figure 2:
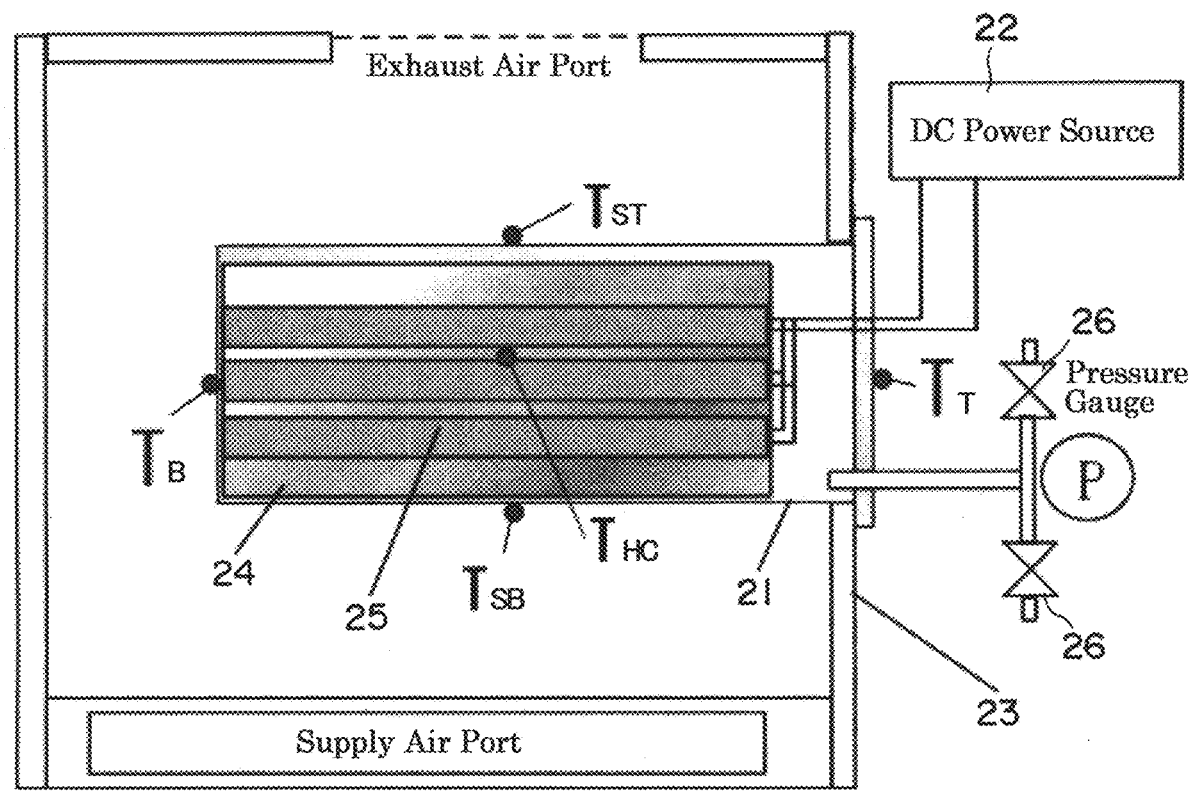
FIG. 2 is a diagram illustrating a structure of a leakage evaluation test apparatus.
Figure 3A:
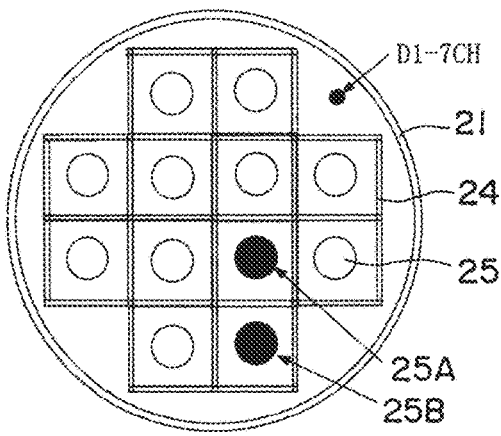
FIGS. 3A to 3E are explanatory diagrams illustrating a structure inside a canister model and temperature measurement positions inside thereof.
Figure 3B:
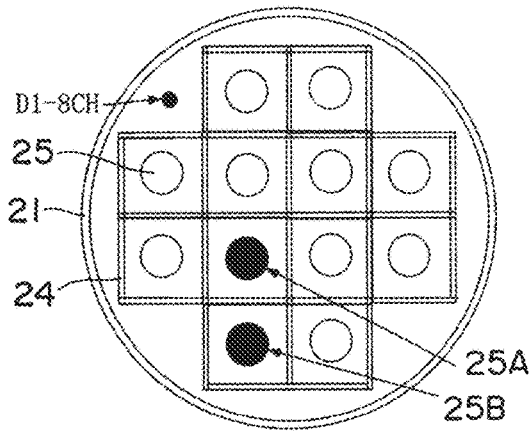
Figure 3C:
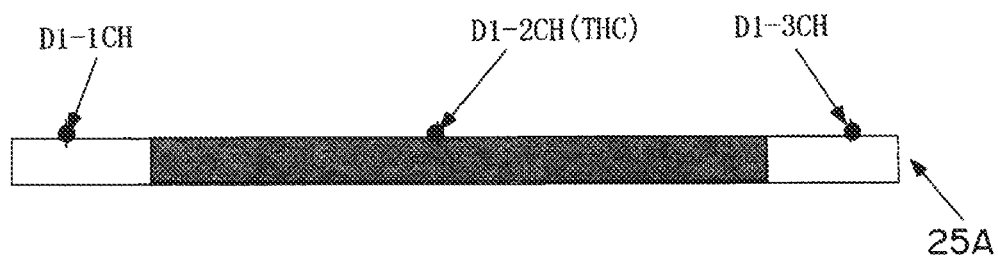
Figure 3D:
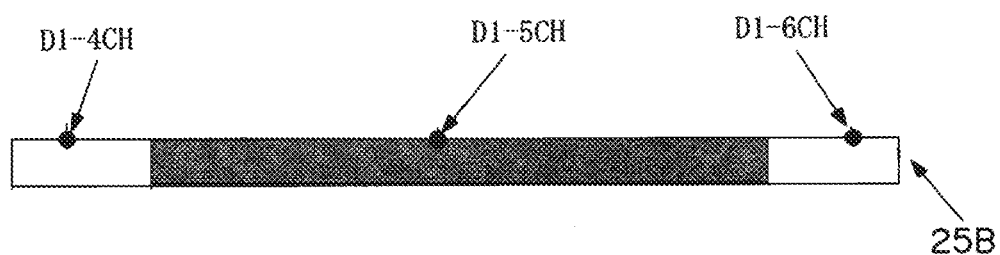
Figure 3E:
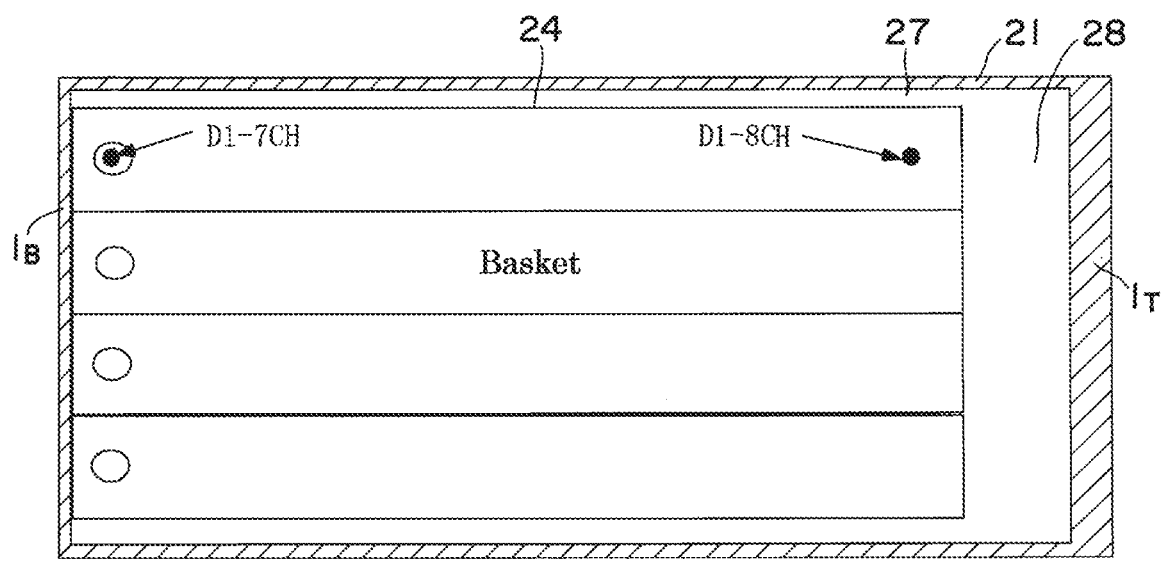

FIG. 2 illustrates a structure of a test apparatus. The test apparatus was formed of a canister model (hereinafter referred to as "canister 21"), a DC power source 22, and a measurement system.

A center portion of the canister 21 was fixed to an outer frame with a wire so as to keep a horizontally-installed attitude. The canister 21 was surrounded by an acrylic plate 23 so as not to be exposed to external air as disturbance.

FIGS. 3A to 3E illustrate an internal structure of the test apparatus and temperature measurement positions.

As the canister 21, a stainless steel cylinder having a height of 260 mm, an outer diameter of 101 mm, and an inner diameter of 97 mm was used. Inside the canister 21, twelve rod-shaped electric heaters 25 simulating nuclear reactor spent fuel rods were loaded inside an aluminum basket 24.

The rod-shaped electric heater 25 had a diameter of 10 mm and had a heat generation unit having a length of 150 mm, and a hollow aluminum pipe having an outer diameter of 10 mm, a thickness of 1 mm, and a length of 35 mm is attached to both ends in a longitudinal axis direction of the rod-shaped electric heater 25.

Thermocouples D1-1ch to D1-3ch were bonded to respective positions of a rod-shaped electric heater 25A, and thermocouples D1-4ch to D1-6ch were bonded to respective positions of a rod-shaped electric heater 25B.

The rod-shaped electric heater 25 (concretely, 25A, 25B) was made to generate heat by using the DC power source 22, and a calorific value was calculated as the product of actually-measured voltage and current applied to the rod-shaped electric heater 25.

Additionally, thermocouples D1-7ch and D1-8ch were used to measure a temperature of a gas inside the canister 21.

Figure 4A:
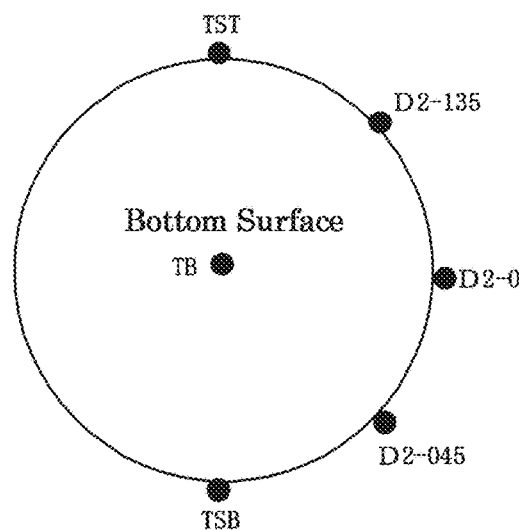
FIGS. 4A to 4C are diagrams illustrating temperature measurement points on a canister outer surface.
Figure 4B:
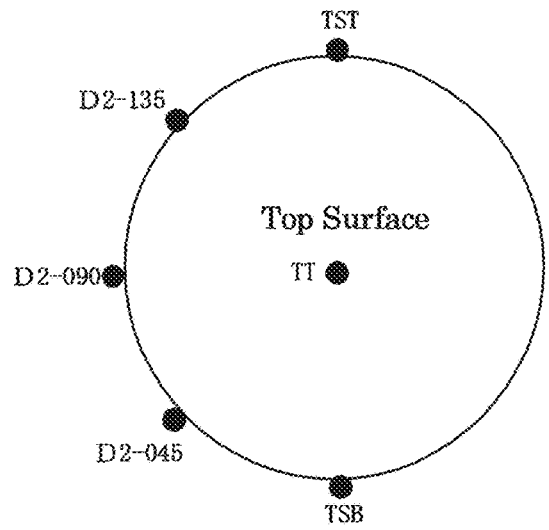
Figure 4C:
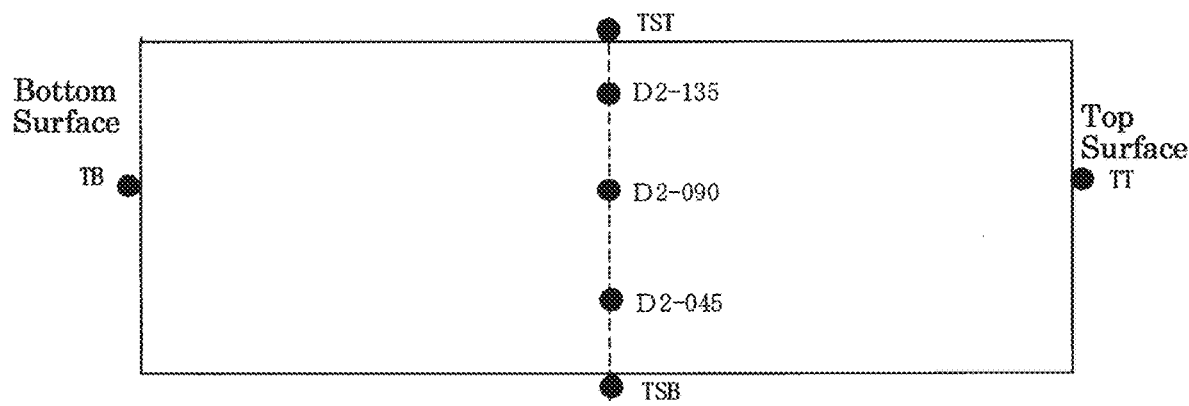

FIGS. 4A to 4C illustrate temperature measurement positions of an outer surface of the canister. Particularly, a canister lid portion temperature $T_T$, a canister bottom portion temperature $T_B$, a canister side surface top surface temperature $T_{ST}$ (corresponding to the canister side surface upper portion temperature), and a canister side surface bottom surface temperature $T_{SB}$ (corresponding to the canister side surface lower portion temperature) were respectively used as temperature monitoring parts, and therefore, were important temperature measurement points. Note that the peripheral surface of the body portion of the canister 21 in the horizontally-installed attitude was a canister side surface, and a peripheral surface of a body portion of the basket 24 in the horizontally-installed attitude was a basket side surface.

(2) Test Conditions and Test Method

In the canister 21 simulating the horizontally-installed canister, air was used as an internal gas, and temperature changes in the respective temperature monitoring parts of the canister 21 were checked at the time of stepwisely changing the air pressure from 5 atm, 3 atm, and to 1 atm (specifically, atmospheric pressure).

The test conditions in Case 1 were a calorific value of 36.6 W and an external air temperature of 25.9° C., and the test conditions in Case 2 were a calorific value of 11.5 W and the external air temperature of 25.1° C.

In the tests, the rod-shaped electric heaters 25 were made to generate heat under a pressurized state, and the pressure was adjusted to 5 atm after confirming that a steady state was obtained. In leakage tests, the pressure was changed stepwisely from 5 atm, 3 atm, and to 1 atm, and temperature data in the steady state at the respective pressures were acquired. Meanwhile, pressure adjustment was performed because pressure increase was caused by increase in the internal temperature when a valve 26 was closed when the pressure was decreased to 3 atm. Additionally, when the pressure was decreased to 1 atm, the valve 26 was opened so as to avoid pressure increase caused by temperature increase.

Note that the air was used as the internal gas in the tests. The reason was that, considering a similarity rule between the actual machine and the model simulating a heat flow phenomenon inside the canister, the closer a Rayleigh number Ra of the model was to a Rayleigh number Ra of the actual machine, the more the test simulating to an actual heat flow phenomenon could be performed. Accordingly, in the tests using the canister model having the 1/18 scale of the actual machine size, the air that could increase the Rayleigh number Ra was used instead of an inert gas such as helium.

(3) Test Results

<Test Results of Case 1>

Figure 7:
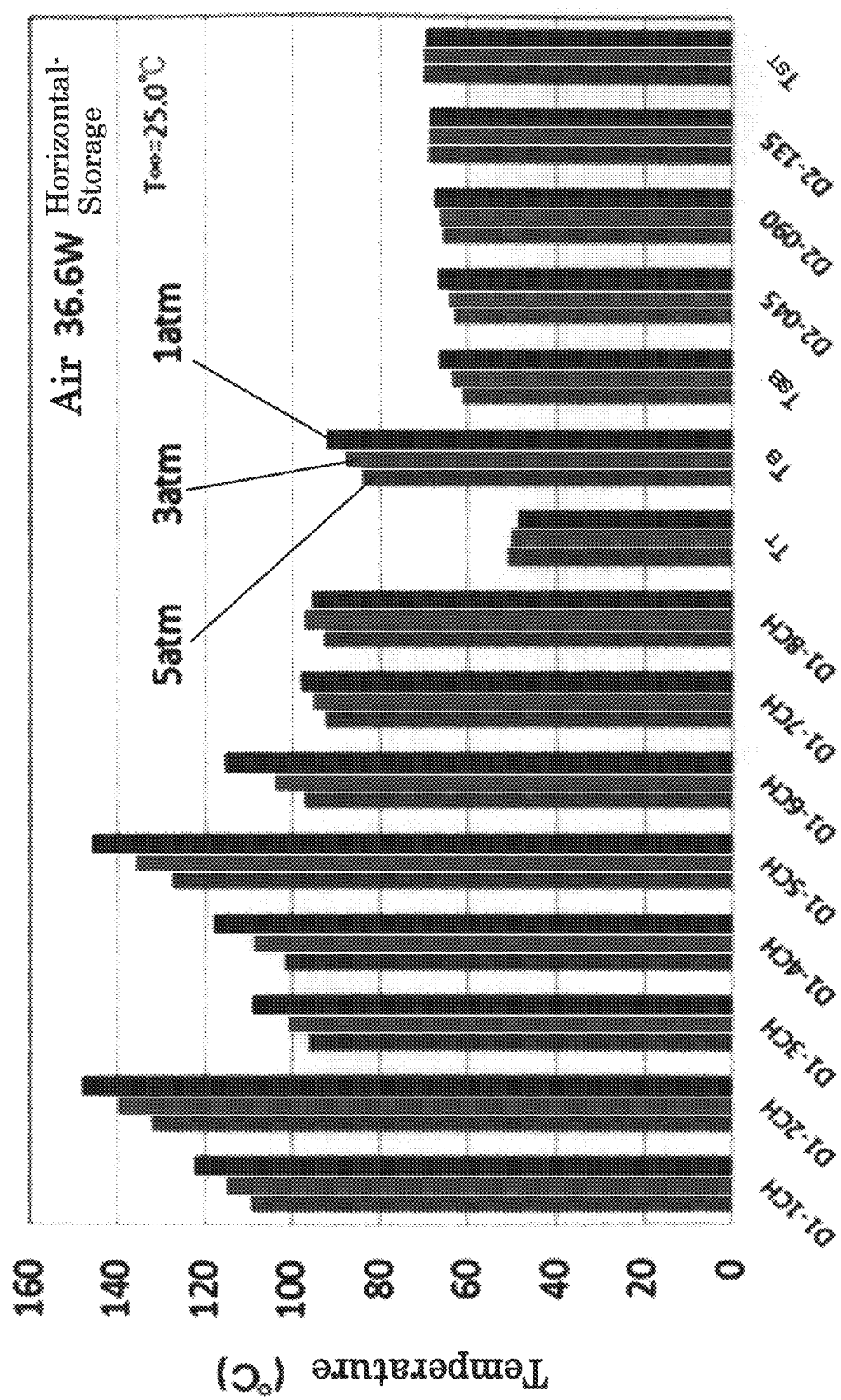
FIG. 7 is a graph illustrating temperatures at the respective temperature measurement points illustrated in FIGS. 4A to 4C of a canister model in Case 1 of a leakage evaluation test.

FIG. 7 illustrates temperatures at the respective temperature measurement points at the time of changing the pressure. Additionally, FIG. 8 illustrates only temperature changes extracted at main temperature measurement points.

Note that respective test data was corrected to a value at the external air temperature of 25° C.

Figure 8:
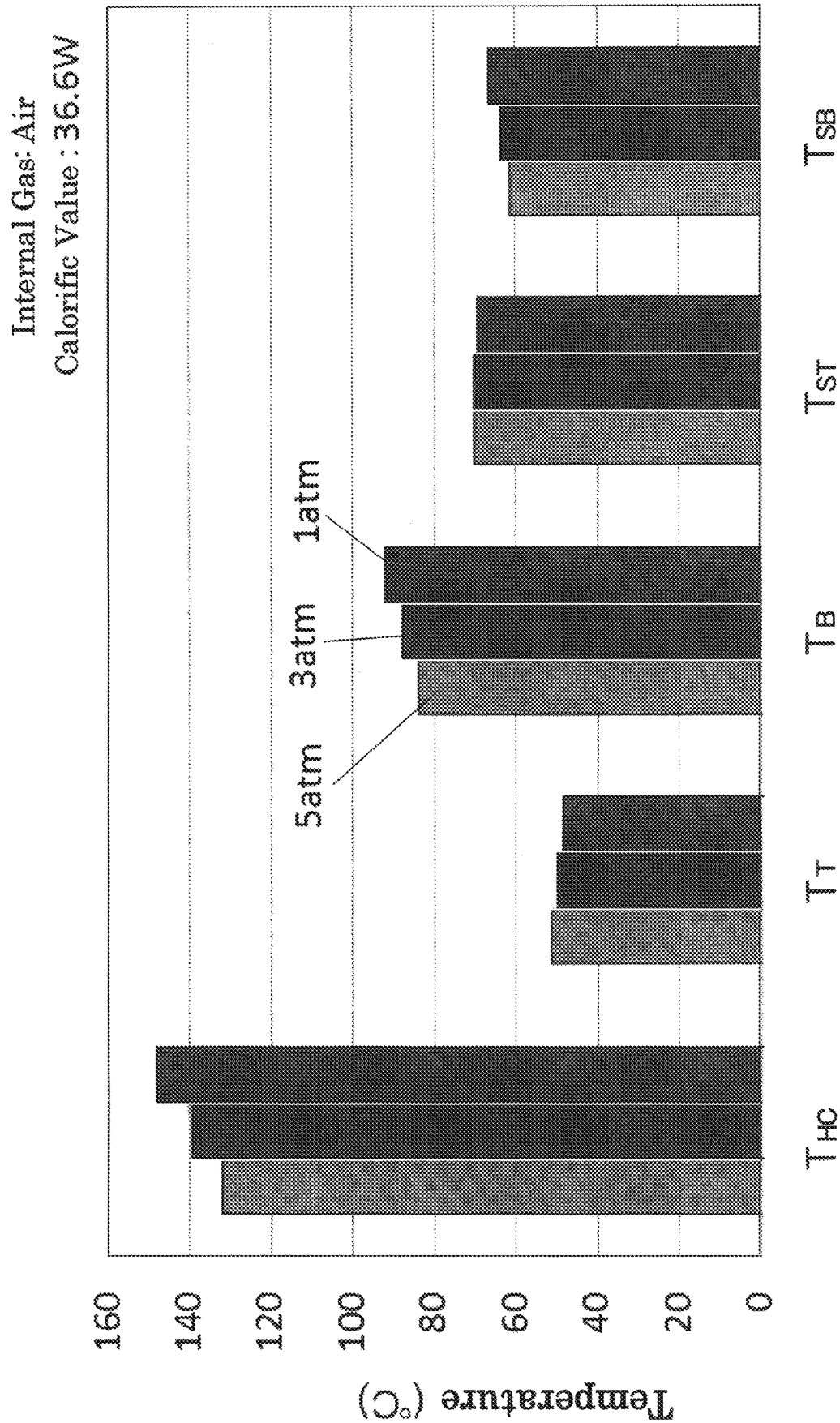
FIG. 8 is a graph extracting temperatures at main temperature measurement points from the graph of FIG. 7.

According to results illustrated in FIGS. 7 and 8, it was confirmed that a heating element center temperature $T_{HC}$ was increased along with pressure decease. A rod-shaped electric heater 25A positioned on an inner side tends to have a temperature higher than a temperature at a rod-shaped electric heater 25B positioned on an outer side, and in the same rod-shaped electric heater, a temperature at the canister bottom portion $1_B$ side tended to be higher than a temperature at the canister lid portion $1_T$ side.

The canister lid portion temperature $T_T$ was decreased along with pressure decrease. On the other hand, the canister bottom portion temperature $T_B$ was increased.

As for the canister side surface, a temperature was increased along with pressure decrease in a region from the canister side surface bottom surface $1_{SB}$ (temperature $T_{SB}$) to be a lowermost portion of the body portion of the canister 21 in the horizontally-installed attitude to a position D2-090 located at 90 degrees with respect to the lowermost portion (specifically, a horizontal plane passing through the center of the canister 21), whereas a temperature was decreased along with pressure decrease at a position D2-135 located at 135 degrees with respect to the lowermost portion and at the canister side surface top surface $1_{ST}$ (temperature $T_{ST}$) to be an uppermost portion of the body portion of the canister 21 in the horizontally-installed attitude.

Note that FIGS. 7 and 8 illustrate, from the left, three kinds of bar graphs representing values at the respective temperature measurement points at the time of decreasing the pressure to 5 atm, 3 atm, and 1 atm.

Figure 9:
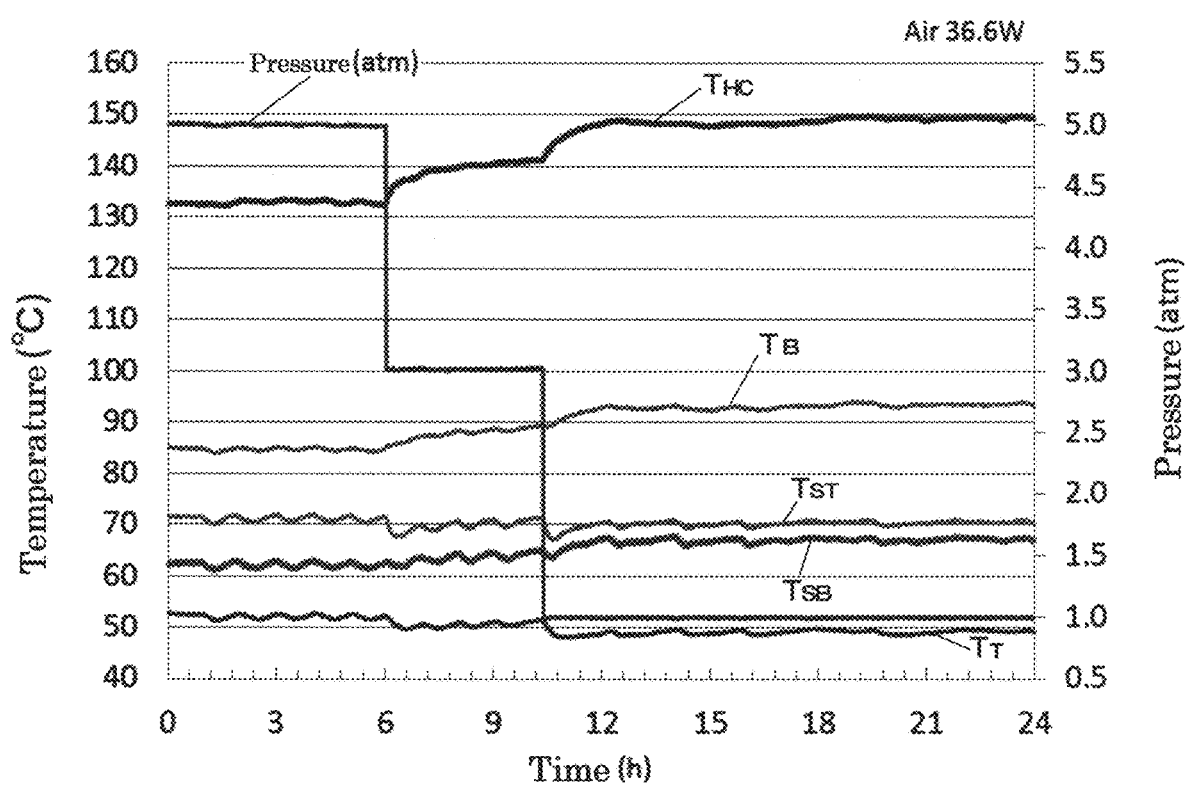
FIG. 9 is a graph illustrating changes in a temperature $T_{HC}$ at a center of a heating element, a temperature $T_T$ at the canister lid portion, a temperature $T_B$ at the canister bottom portion, a temperature $T_{SB}$ at a canister side surface lower portion, and a temperature $T_{ST}$ at a canister side surface upper portion relative to an internal pressure of the canister before and after helium leakage in Case 1.

FIG. 9 illustrates temporal changes in temperatures at the main temperature measurement points relative to the pressure change, in which the temperatures include the heating element center temperature $T_{HC}$, canister lid portion temperature $T_T$, canister bottom portion temperature $T_B$, canister side surface top surface temperature $T_{ST}$, and canister side surface bottom surface temperature $T_{SB}$.

When the pressure was decreased by gas leakage, heat removal efficiency by heat conduction was degraded, and the heating element center temperature $T_{HC}$ was increased.

Figure 6:
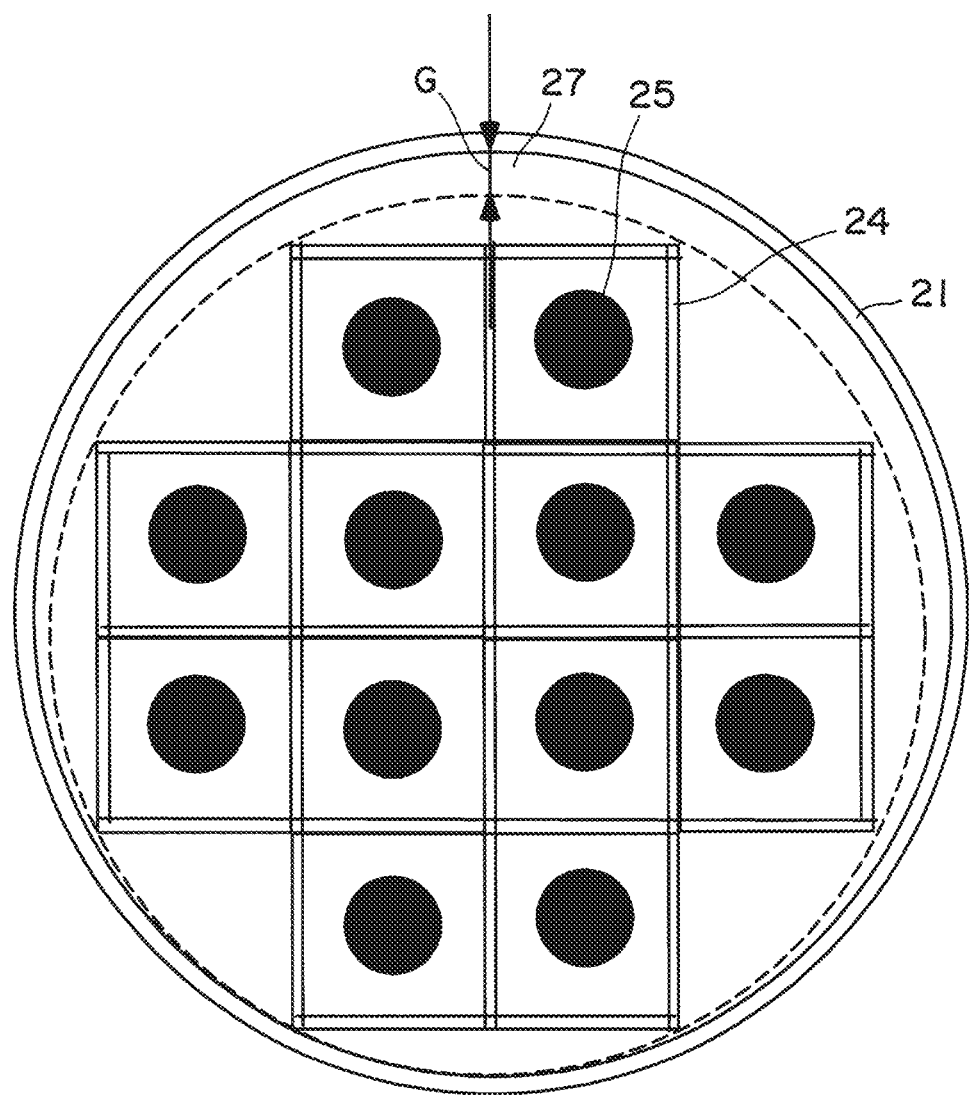
FIG. 6 is a cross-sectional view of the canister model.

Since a bottom portion of the heater (in other words, one end in a longitudinal axis direction of a rod-shaped electric heater 25) contacted or was close to the canister bottom portion, heat of the rod-shaped electric heater 25 was transferred to the canister bottom portion and the canister bottom portion temperature $T_B$ was largely increased. Also, as illustrated in FIG. 6, since the basket 24 also contacted a lower surface on an inner side of the canister side surface due to gravity, heat of the basket 24 was transferred to the lower surface on the inner side of the canister side surface, and the canister side surface bottom surface temperature $T_{SB}$ was slightly increased.

On the other hand, there was a space 28 between a top portion of the heater (in other words, the other end in the longitudinal axis direction of the rod-shaped electric heater 25) and the canister lid portion, and heat was hardly transferred. Additionally, since a slight space 27 was formed between a top surface of the basket side surface and a top surface on the inner side of the canister side surface, heat of this portion was hardly transferred.

Since the calorific value was constant regardless of a pressure change, it could be considered that: the canister bottom portion temperature $T_B$ and the canister side surface bottom surface temperature $T_{SB}$ were increased; and the canister lid portion temperature $T_T$ and the canister side surface top surface temperature $T_{ST}$ were decreased by an amount corresponding to the increase in a heat radiation amount from these portion to the atmospheric air; and as a result, the canister lid portion temperature $T_T$ and the canister side surface top surface temperature $T_{ST}$ were decreased.

FIG. 10 illustrates temporal changes in a temperature difference $\Delta T_{BT}$ at the time of pressure decrease, in which the temperature difference $\Delta T_{BT}$ is obtained by subtracting the canister lid portion temperature $T_T$ from the canister bottom portion temperature $T_B$.

The temperature change between the canister bottom portion temperature $T_B$ and the canister lid portion temperature $T_T$ was greater than the temperature change on the canister side surface at the time of pressure decrease, and the temperature difference $\Delta T_{BT}$ between the canister bottom portion temperature $T_B$ and the canister lid portion temperature $T_T$ was increased by about 11° C. relative to decrease of 4 atm.

FIG. 11 illustrates temporal changes in a temperature difference $\Delta T_{SBST}$ at the time of pressure decrease, in which the temperature difference $\Delta T_{SBST}$ is obtained by subtracting the canister side surface top surface temperature $T_{ST}$ from the canister side surface bottom surface temperature $T_{SB}$.

The temperature difference $\Delta T_{SBST}$ was increased by about 5.5° C. relative to decrease of 4 atm. As reasons for that the temperature difference $\Delta T_{SBST}$ was smaller than $\Delta T_{BT}$, it could be considered that the high-temperature heating element (specifically, rod-shaped electric heater 25 here) contacted or was close to the canister bottom portion while the basket 24 contacted the canister side surface lower portion, and also it could be considered that a decrease rate of a heat flux generated by the gas at the time of pressure decrease was smaller because: a temperature of the basket 24 was lower than that of the rod-shaped electric heater 25; and an amount of the gas enclosed in the space 27 between the top surface on the inner side of the canister side surface and the top surface of the basket side surface was smaller due to the structure in which the space 27 was narrower than the space 28 between the canister lid portion and the basket 24.

However, the temperature change at the time of pressure change surrounded by the broken line, specifically, responsiveness to the pressure change of $\Delta T_{SBST}$ was better than the responsiveness relative to the pressure change of $\Delta T_B$. As a reason for having the good responsiveness, it could be considered that a change rate of a heat flux transferred from the gas to the canister 21 was faster in the canister side surface top surface temperature $T_{ST}$ than in the canister lid portion temperature $T_T$ due to the structure in which the space 27 between the top surface on the inner side of the canister side surface and the top surface of the basket side surface was narrower than the space 28 between the canister lid portion and the basket top portion.

FIG. 12 illustrates temporal changes in the temperature difference $\Delta T_{BST}$ at the time of pressure decrease, in which the temperature difference $\Delta T_{BST}$ is obtained by subtracting the canister side surface top surface temperature $T_{ST}$ from the canister bottom portion temperature $T_B$.

Responsiveness to the pressure change was kept excellent. Meanwhile, since the canister bottom portion temperature $T_B$ having a large temperature increase rate at the time of pressure decrease was adopted, the temperature difference $\Delta T_{BST}$ was larger than $T_{SBST}$ and a change amount was about 10° C. before and after pressure decrease.

FIG. 13 illustrates temporal changes in a temperature difference $\Delta T_{SBT}$ at the time of pressure decrease, in which the temperature difference $\Delta T_{SBT}$ is obtained by subtracting the canister lid portion temperature $T_T$ from the canister side surface bottom surface temperature $T_{SB}$. A change amount before and after the pressure decrease was about 8° C.

FIG. 14 illustrates temporal changes in the sum $\Delta T_4$ of the temperature differences at the time of pressure decrease, and the sum $\Delta T_4$ is obtained by adding $\Delta T_{BT}$ and $\Delta T_{SBST}$ and uses, as the temperature monitoring parts, all of the parts of: the canister bottom portion temperature $T_B$ and the canister side surface bottom surface temperature $T_{SB}$ both having the surface temperatures increased at the time of pressure decrease; and the canister lid portion temperature $T_T$ and the canister side surface top surface temperature $T_{ST}$ both having the surface temperatures decreased at the time of pressure decrease. A change amount before and after the pressure decrease was about 16.5° C.

FIG. 15 illustrates temporal changes of the sum $\Delta T_{3R}$ of the temperature differences at the time of pressure decrease, and the sum $\Delta T_{3R}$ is obtained by adding $\Delta T_{SBST}$ and $\Delta T_{BST}$ both having good responsiveness to the pressure change and uses, as the temperature monitoring parts, the three parts of: the canister bottom portion temperature $T_B$ and the canister side surface bottom surface temperature $T_{SB}$ both having the surface temperatures increased at the time of pressure decrease; and the canister side surface top surface temperature $T_{ST}$ having the surface temperature decreased at the time of pressure decrease. In this case, a change amount before and after the pressure decrease is more increased to about 15° C. while keeping good responsiveness to the pressure change.

Additionally, FIG. 16 illustrates temporal changes of the sum $\Delta T_{3GR}$ of the temperature differences at the time of pressure decrease, and the sum $\Delta T_{3GR}$ is obtained by adding $\Delta T_{BT}$ and $\Delta T_{BST}$ both having large temperature differences relative to the pressure change and uses, as the temperature monitoring parts, three parts of: the canister bottom portion temperature $T_B$ having the surface temperature increased at the time of pressure decrease; and the canister lid portion temperature $T_T$ and the canister side surface top surface temperature $T_{ST}$ both having the surface temperatures decreased at the time of pressure decrease. A change amount before and after the pressure decrease was about 21° C.

<Test Results of Case 2>

Figure 17:
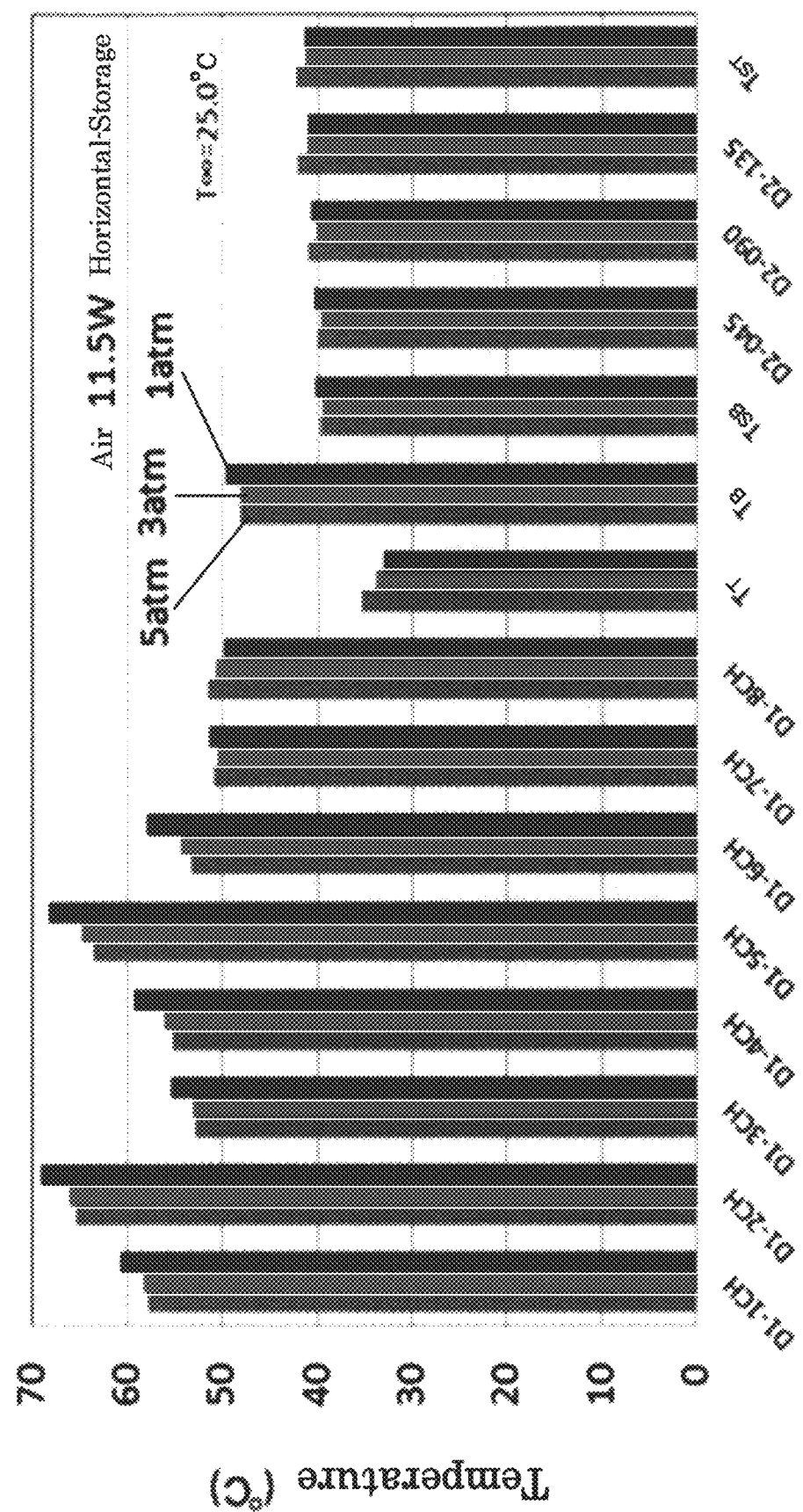
FIG. 17 is a graph illustrating temperatures at the respective temperature measurement points illustrated in FIGS. 4A to 4C of the canister model in Case 2 of the leakage evaluation test.

FIG. 17 is a graph illustrating temperatures at the respective temperature measurement points of the canister 21 at the time of changing the pressure under a test condition in which a calorific value of a heating element (here specifically, the rod-shaped electric heater 25) is reduced to about 30%, compared to Case 1. Note that respective test data was corrected to a value at the external air temperature of 25° C.

A tendency of the temperature change was substantially same as the tendency in Case 1, but the temperatures were generally low because the caloric value was small. Additionally, the canister lid portion temperature $T_T$ was decreased in proportion to the pressure at the time of pressure decrease while the canister bottom portion temperature $T_B$ had a small temperature change at the time of decrease from 5 atm to 3 atm. Furthermore, no temperature change in proportion to the pressure change was observed in the canister side surface bottom surface temperature $T_{SB}$ and the canister side surface top surface temperature $T_{ST}$ at the time of pressure decrease.

Figure 18:
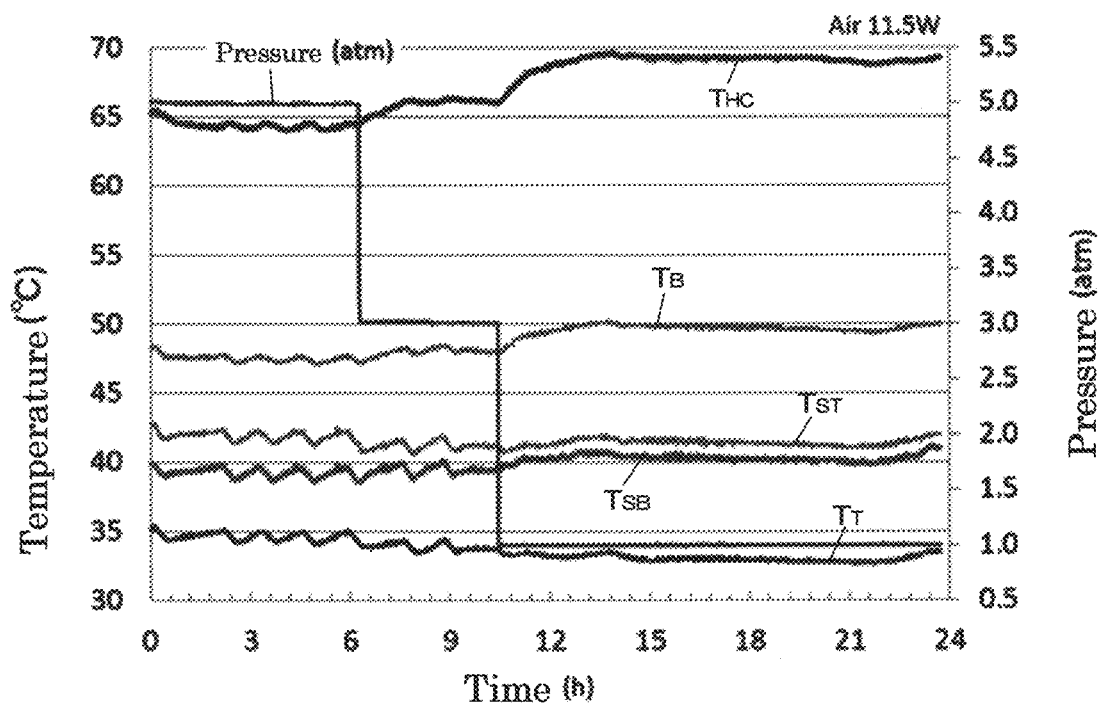
FIG. 18 is a graph illustrating changes in the temperature $T_{HC}$ at the center of the heating element, the temperature $T_T$ at the canister lid portion, the temperature $T_B$ at the canister bottom portion, the temperature $T_{SB}$ at the canister side surface lower portion, and temperature $T_{ST}$ at the canister side surface upper portion relative to the internal pressure of the canister before and after helium leakage in Case 2.
Figure 19:
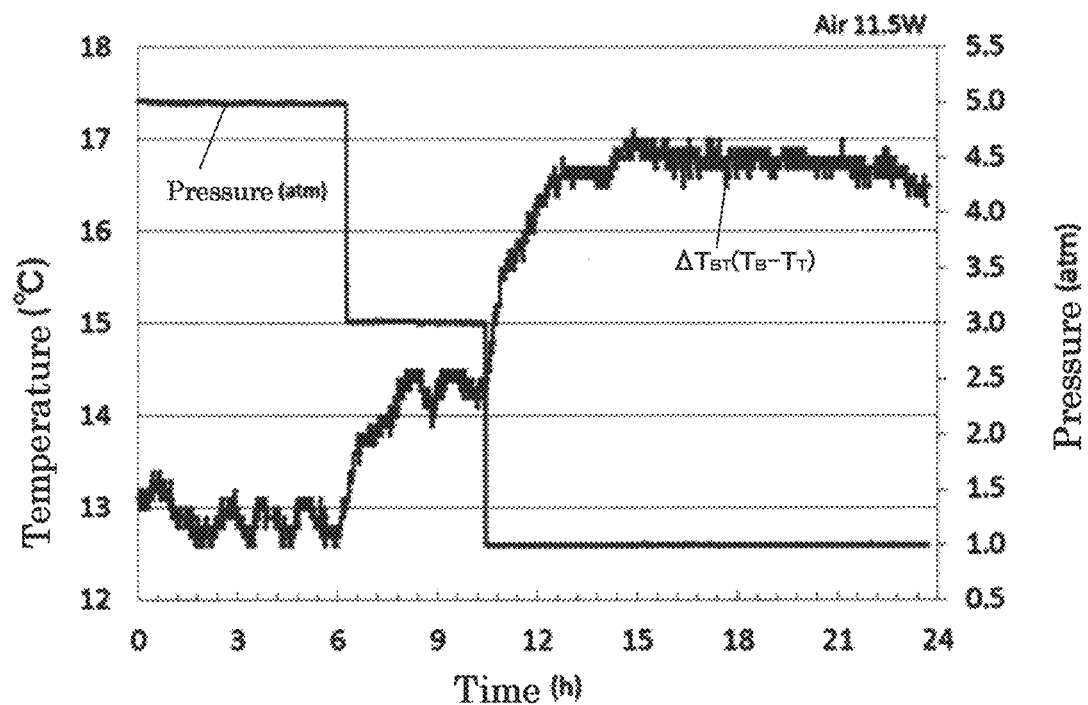
FIG. 19 is a graph illustrating changes in the temperature difference $\Delta T_{BT}$ between the temperature $T_T$ at the canister lid portion and the temperature $T_B$ at the canister bottom portion relative to the internal pressure of a canister before and after helium leakage in Case 2.
Figure 20:
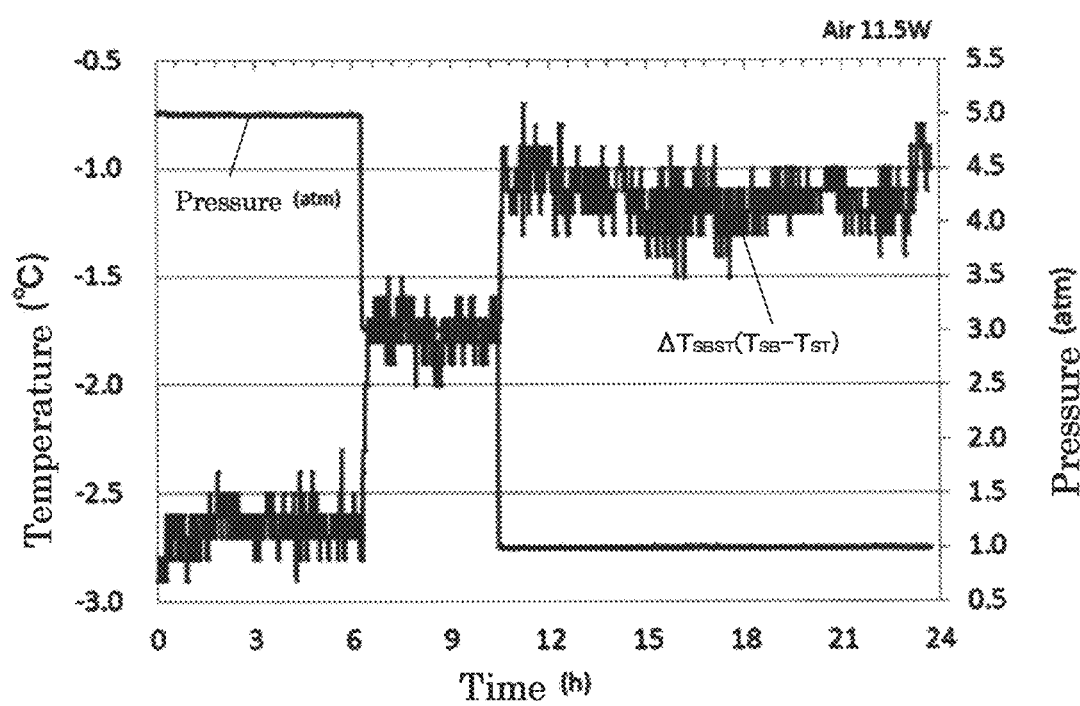
FIG. 20 is a graph illustrating changes in the temperature difference $\Delta T_{SBST}$ between the temperature $T_{SB}$ at the canister side surface lower portion and the temperature $T_{ST}$ at the canister side surface upper portion relative to the internal pressure of the canister before and after helium leakage in Case 2.

FIG. 18 illustrates temporal changes of temperatures at the main temperature measurement points relative to the pressure change. Additionally, FIG. 19 illustrates temporal changes of the temperature difference $\Delta T_{BT}$ relative to the pressure change, and a change amount before and after the pressure decrease was about 3.5° C. FIG. 20 illustrates temporal changes of the temperature difference $\Delta T_{SBST}$ relative to the pressure change, and a change amount before and after the pressure decrease was about 1.5° C.

From the above test results, it was found that even when a calorific value was decreased along with decrease in decay heat of spent fuel, a change in temperature difference indicating gas leakage could be detected.

(4) Conclusion

From the above test results, it is clarified that a factor that causes, in the horizontally-installed canister, the temperature changes different from temperature changes of a vertically-installed canister was a peculiar phenomenon caused by the internal structure of the canister.

Specifically, the lattice-like partitions called the basket (in other words, honeycomb structure) are housed inside the canister, and the spent fuel that is the radioactive material is stored in each of the cells. Additionally, the space between the basket (reference sign 24 in Example) and the canister (21) is extremely narrow, and even when the basket (24) contacts, due to gravity, the inner peripheral surface of the canister side surface bottom portion to be the lower portion of the canister body portion by horizontally installing the canister (21), the space (27) formed between the basket (24) and the inner peripheral surface of the canister side surface upper portion to be the upper portion of the body portion of the canister (21) is extremely narrow such as about 4 mm relative to the actual machine having the length of, for example, about 2.5 m. Furthermore, since the spent fuel is suspended and charged from the top into the canister that is made to stand inside a reactor pool, the spent fuel contacts or is close to the canister bottom portion even though the canister is horizontally installed. Also, since a gas around the spent fuel is surrounded by the basket (24) and can be moved only in the horizontal direction, heat is moved only in the lateral direction.

Figure 5A:
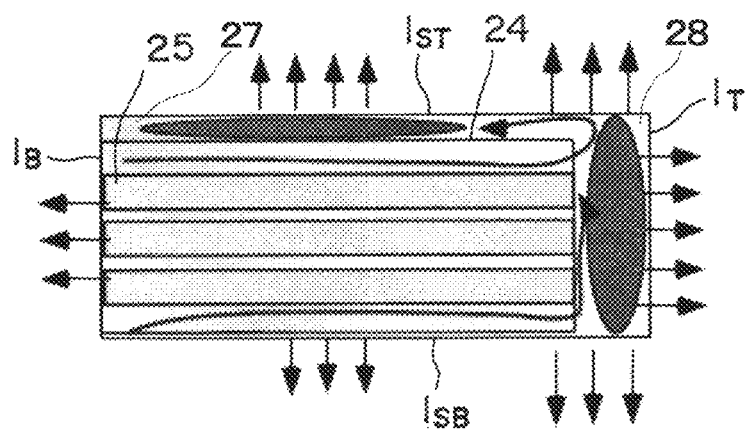
FIGS. 5A and 5B are schematic diagrams to describe a heat generation mechanism inside the canister.

Due to this, as illustrated in FIG. 5A, the hot gas around the spent fuel is moved mainly in the lateral direction along the basket 24 at the time of high pressure before gas leakage. Therefore, heat having large heat capacity is accumulated in a space on the canister lid portion $1_T$ side, and the heat is released from the space via the canister lid portion $1_T$, and therefore, the temperature of the canister lid portion $1_T$ is increased. On the other hand, since the spent fuel contacts or is close to the canister bottom portion $1_B$ side, and the heat of the spent fuel is largely transferred by heat conduction. Additionally, the hot gas is also accumulated in the space between the inner peripheral surface upper portion of the body portion and the basket 24 of the horizontally-installed canister although the accumulation amount is not much. Due to such hot gas accumulation, the temperature in this space is also increased. Furthermore, the basket 24 contacts, due to gravity, the inner peripheral surface lower portion of the canister on the canister side surface lower portion $1_{SB}$ side to be the inner peripheral surface lower portion of the body portion of the horizontally-installed canister. Therefore, the heat of the spent fuel is transferred to the canister by heat conduction via the basket 24.

Figure 5B:
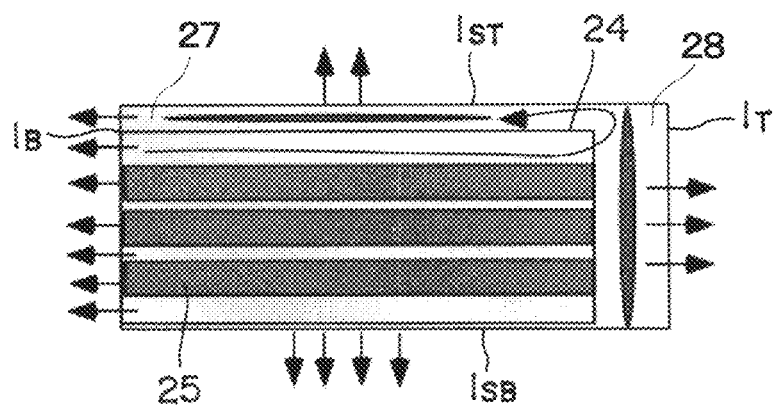

However, when the internal pressure of the canister is decreased by gas leakage, natural convection of the gas contributing to heat removal of the spent fuel is reduced as illustrated in FIG. 5B. Therefore, cooling-effect is decreased, and as a result the temperature of the spent fuel is increased. This temperature increase of the spent fuel is largely transferred by heat conduction to the canister bottom portion $1_B$ side that contacts the spent fuel, and the temperature of the canister bottom portion $1_B$ is increased. On the other hand, an amount of hot gas accumulated in the space on the canister lid portion $1_T$ side is reduced due to decrease of natural convection of the gas, and a heat flux on the canister lid portion $1_T$ side is reduced, and then the temperature of the canister lid portion $1_T$ is decreased. Additionally, since the space between the side surface upper portion $1_{ST}$ and the basket 24 of the horizontally-installed canister is narrow and slight, the hot gas is accumulated little inherently. Therefore, an amount of temperature decrease caused by decrease in the amount of the hot gas due to the decrease in natural convection is also little. Furthermore, since the heat of the spent fuel having the increased temperature is transferred to the canister by heat conduction via the basket 24, the temperature is increased at the canister side surface lower portion $1_{SB}$. However, this change is smaller than the temperature increase at the canister bottom portion $1_B$ that contacts the spent fuel.

From the above facts, it is found that temperatures are changed in the horizontally-installed canister at the time of gas leakage in the four parts (specifically, all of surfaces/parts of the canister) including the canister bottom portion, canister lid portion, canister side surface lower portion, and canister side surface upper portion. Additionally, the four parts are separated into: two parts where surface temperatures are decreased; and the two parts where surface temperatures are increased. Also, temperature increase parts are separated into a part having large temperature increase and a part having little temperature increase, and temperature decrease parts are separated into a part having large temperature decrease and a part having little temperature decrease. Therefore, there is a change caused by gas leakage in any temperature difference between any parts.

What is claimed is:

1. A gas leakage detection method in a horizontally-installed canister comprising a basket containing spent nuclear fuel inserted in the canister, the method comprising:
monitoring each of a temperature $T_B$ at a canister bottom portion to be one end portion in a lateral direction in a horizontally-installed attitude of the canister that is horizontally installed and housed inside a concrete silo, a temperature $T_{SB}$ at a canister side surface lower portion located below a horizontal plane passing through a center of the canister in the horizontally-installed attitude, a temperature $T_T$ at a canister lid portion to be the other end portion in the lateral direction in the horizontally-installed attitude, and a temperature $T_{ST}$ at a canister side surface upper portion located above the horizontal plane passing through the center of the canister in the horizontally-installed attitude, wherein the monitoring identifies changes in movement of inert gas inside the canister warmed by the spent fuel, where a direction of flow of the warmed inert gas is restricted by a wall of the basket, such that the inert gas moves along the wall of the basket in a lateral direction and heat of the spent fuel is transferred to the canister side surface by heat conduction via the basket; and
determining occurrence of leakage of the inert gas inside the canister based on changes between temperatures of monitoring points for each of the temperatures $T_B$, $T_{SB}$, $T_T$, and $T_{ST}$.

2. The gas leakage detection method in a horizontally-installed canister according to claim 1, further comprising determining occurrence of leakage of the inert gas inside the canister when there is a change in a temperature difference between one or both of the temperature $T_B$ at the canister bottom portion and the temperature $T_{SB}$ at the canister side surface lower portion and one or both of the temperature $T_T$ at the canister lid portion and the temperature $T_{ST}$ at the canister side surface upper portion.

3. The gas leakage detection method in a horizontally-installed canister according to claim 1, wherein the temperature $T_B$ at the canister bottom portion is a temperature at a center of the canister bottom portion, the temperature $T_{SB}$ at the canister side surface lower portion is a temperature at a bottom portion of the canister side surface to be a lowermost portion in the horizontally-installed attitude, the temperature $T_T$ at the canister lid portion is a temperature at a center of the canister lid portion, and the temperature $T_{ST}$ at the canister side surface upper portion is a temperature at a top portion of the canister side surface to be an uppermost portion in the horizontally-installed attitude.

4. The gas leakage detection method in a horizontally-installed canister according to claim 2, further comprising determining occurrence of leakage of the inert gas inside the canister when there is a change in a temperature difference $\Delta T_{BT}$ (where $\Delta T_{BT}=T_B-T_T$) between the temperature $T_T$ at the canister lid portion and the temperature $T_B$ at the canister bottom portion.

5. The gas leakage detection method in a horizontally-installed canister according to claim 2, further comprising determining occurrence of leakage of the inert gas inside the canister when there is a change in a temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

6. The gas leakage detection method in a horizontally-installed canister according to claim 2, further comprising determining occurrence of leakage of the inert gas inside the canister when there is a change in a temperature difference $\Delta T_{SBST}$ (where $\Delta T_{SBST}=T_{SB}-T_{ST}$) between the temperature $T_{SB}$ at the canister side surface lower portion and the temperature $T_{ST}$ at the canister side surface upper portion.

7. The gas leakage detection method in a horizontally-installed canister according to claim 2, further comprising determining occurrence of leakage of the inert gas inside the canister when there is a change in sum $\Delta T_4$ (where $\Delta T_4=\Delta T_{BT}+\Delta T_{SBST}$) obtained by adding the temperature difference $\Delta T_{BT}$ ($\Delta T_{BT}=T_B-T_T$) between the temperature $T_T$ at the canister lid portion and the temperature $T_B$ at the canister bottom portion to the temperature difference $\Delta T_{SBST}$ (where $\Delta T_{SBST}=T_{SB}-T_{ST}$) between the temperature $T_{SB}$ at the canister side surface lower portion and the temperature $T_{ST}$ at the canister side surface upper portion.

8. The gas leakage detection method in a horizontally-installed canister according to claim 2, further comprising determining occurrence of leakage of the inert gas inside the canister when there is a change in sum $\Delta T_{3GR}$ (where $\Delta T_{3GR}=\Delta T_{BT}+\Delta T_{BST}$) obtained by adding the temperature difference $\Delta T_{BT}$ ($\Delta T_{BT}=T_B-T_T$) between the temperature $T_B$ at the canister bottom portion and the temperature $T_T$ at the canister lid portion to the temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

9. The gas leakage detection method in a horizontally-installed canister according to claim 2, further comprising determining occurrence of leakage of the inert gas inside the canister when there is a change in sum $\Delta T_{3R}$ (where $\Delta T_{3R}=\Delta T_{SBST}+\Delta T_{BST}$) obtained by adding the temperature difference $\Delta T_{SBST}$ ($\Delta T_{SBST}=T_{SB}-T_{ST}$) between the temperature $T_{SB}$ at the canister side surface lower portion and the temperature $T_{ST}$ at the canister side surface upper portion to the temperature difference $\Delta T_{BST}$ (where $\Delta T_{BST}=T_B-T_{ST}$)

between the temperature $T_B$ at the canister bottom portion and the temperature $T_{ST}$ at the canister side surface upper portion.

10. A gas leakage detection apparatus in a horizontally-installed canister comprising a basket containing spent nuclear fuel inserted in the canister, the gas leakage detection apparatus comprising:
a first temperature sensor configured to measure a temperature $T_B$ at a canister bottom portion to be one end portion in a lateral direction in a horizontally-installed attitude of the canister that is horizontally installed and housed inside a concrete silo, a third temperature sensor configured to measure a temperature $T_{SB}$ at a canister side surface lower portion located below a horizontal plane passing through a center of the canister in the horizontally-installed attitude, a second temperature sensor configured to measure a temperature $T_T$ at a canister lid portion to be the other end portion in the lateral direction in the horizontally-installed attitude, and a fourth temperature sensor configured to measure a temperature $T_{ST}$ at a canister side surface upper portion located above the horizontal plane passing through the center of the canister in the horizontally-installed attitude;
a monitoring unit configured to monitor measurement values of the first temperature sensor, the second temperature sensor, the third temperature sensor, and the fourth temperature sensor to identify changes in movement of inert gas inside the canister warmed by the spent fuel, where a direction of flow of the warmed inert gas is restricted by a wall of the basket, such that the inert gas moves along the wall of the basket in a lateral direction and heat of the spent fuel is transferred to the canister side surface by heat conduction via the basket; and
a gas leakage determination unit configured to determine occurrence of leakage of the inert gas inside the canister based on temperature changes between monitored measurement values for each of the temperatures $T_B$, $T_{SB}$, $T_T$, and $T_{ST}$.

11. The gas leakage detection method in a horizontally-installed canister according to claim 2, wherein the temperature $T_B$ at the canister bottom portion is a temperature at a center of the canister bottom portion, the temperature $T_{SB}$ at the canister side surface lower portion is a temperature at a bottom portion of the canister side surface to be a lowermost portion in the horizontally-installed attitude, the temperature $T_T$ at the canister lid portion is a temperature at a center of the canister lid portion, and the temperature $T_{ST}$ at the canister side surface upper portion is a temperature at a top portion of the canister side surface to be an uppermost portion in the horizontally-installed attitude.

12. The gas leakage detection method in a horizontally-installed canister according to claim 3, further comprising determining occurrence of leakage of the inert gas inside the canister when there is a change in a temperature difference $\Delta T_{BT}$ (where $\Delta T_{BT}=T_B-T_T$) between the temperature $T_T$ at the canister lid portion and the temperature $T_B$ at the canister bottom portion.

13. The gas leakage detection method in a horizontally-installed canister according to claim 3, further comprising determining occurrence of leakage of the inert gas inside the canister when there is a change in a temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

14. The gas leakage detection method in a horizontally-installed canister according to claim 3, further comprising determining occurrence of leakage of the inert gas inside the canister when there is a change in a temperature difference $\Delta T_{SBST}$ (where $\Delta T_{SBST}=T_{SB}-T_{ST}$) between the temperature $T_{SB}$ at the canister side surface lower portion and the temperature $T_{ST}$ at the canister side surface upper portion.

15. The gas leakage detection method in a horizontally-installed canister according to claim 3, further comprising determining occurrence of leakage of the inert gas inside the canister when there is a change in sum $\Delta T_4$ (where $\Delta T_4=\Delta T_{BT}+\Delta T_{SBST}$) obtained by adding the temperature difference $\Delta T_{BT}$ ($\Delta T_{BT}=T_B-T_T$) between the temperature $T_T$ at the canister lid portion and the temperature $T_B$ at the canister bottom portion to the temperature difference $\Delta T_{SBST}$ (where $\Delta T_{SBST}=T_{SB}-T_{ST}$) between the temperature $T_{SB}$ at the canister side surface lower portion and the temperature $T_{ST}$ at the canister side surface upper portion.

16. The gas leakage detection method in a horizontally-installed canister according to claim 3, further comprising determining occurrence of leakage of the inert gas inside the canister when there is a change in sum $\Delta T_{3GR}$ (where $\Delta T_{3GR}=\Delta T_{BT}+\Delta T_{BST}$) obtained by adding the temperature difference $\Delta T_{BT}$ ($\Delta T_{BT}=T_B-T_T$) between the temperature $T_B$ at the canister bottom portion and the temperature $T_T$ at the canister lid portion to the temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

17. The gas leakage detection method in a horizontally-installed canister according to claim 3, further comprising determining occurrence of leakage of the inert gas inside the canister when there is a change in sum $\Delta T_{3R}$ (where $\Delta T_{3R}=\Delta T_{SBST}+\Delta T_{BST}$) obtained by adding the temperature difference $\Delta T_{SBST}$ ($\Delta T_{SBST}=T_{SB}-T_{ST}$) between the temperature $T_{SB}$ at the canister side surface lower portion and the temperature $T_{ST}$ at the canister side surface upper portion to the temperature difference $\Delta T_{BST}$ (where $\Delta T_{BST}=T_B-T_{ST}$) between the temperature $T_B$ at the canister bottom portion and the temperature $T_{ST}$ at the canister side surface upper portion.

18. The gas leakage detection method in a horizontally-installed canister according to claim 1, wherein the monitoring further identifies heat transferred from the spent fuel to the bottom of the canister and to the side surface lower portion of the canister by heat conduction.

* * * * *